(12) United States Patent
Takahara et al.

(10) Patent No.: US 7,433,599 B2
(45) Date of Patent: Oct. 7, 2008

(54) AUTOMATIC DISPERSION COMPENSATION DEVICE AND COMPENSATION METHOD

(75) Inventors: Tomoo Takahara, Kawasaki (JP); Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 10/446,694

(22) Filed: May 29, 2003

(65) Prior Publication Data

US 2003/0223760 A1 Dec. 4, 2003

(30) Foreign Application Priority Data

May 31, 2002 (JP) ............................. 2002-159062

(51) Int. Cl.
*H04J 14/02* (2006.01)
(52) U.S. Cl. ............................. 398/81; 398/95; 398/147
(58) Field of Classification Search .................. 398/81, 398/92–96, 152, 147
See application file for complete search history.

(56) References Cited

U.S. PATENT DOCUMENTS

| 5,608,562 | A | 3/1997 | Delavaux et al. | |
|---|---|---|---|---|
| 6,483,958 | B2 | 11/2002 | Bandemer et al. | |
| 6,681,082 | B1 * | 1/2004 | Tanaka et al. | 398/158 |
| 6,871,024 | B2 * | 3/2005 | Nishimoto et al. | 398/159 |
| 6,909,851 | B2 * | 6/2005 | Ishikawa | 398/147 |
| 2002/0015207 | A1 | 2/2002 | Ooi et al. | |
| 2002/0018267 | A1 * | 2/2002 | Sun et al. | 359/161 |

FOREIGN PATENT DOCUMENTS

| EP | 1 030 472 A2 | 8/2000 |
|---|---|---|
| JP | 7-221705 | 8/1995 |
| JP | 9-72827 | 3/1997 |
| JP | 9-326755 | 12/1997 |
| JP | 11-8590 | 1/1999 |
| JP | 2001-77756 | 3/2001 |
| JP | 2002-208892 | 7/2002 |
| WO | 01/86840 A2 | 11/2001 |
| WO | 01/93466 A2 | 12/2001 |

OTHER PUBLICATIONS

Office Action for European Patent Application No. 03 011 116.5, mailed Nov. 16, 2005.
Shirasaki et al., "Variable Dispersion Compensator Using the Virtually Imaged Phased Array (VIPA) for 40-Gbit/s WDM Transmission Systems", ECOC2000, PD Topic 2,2.3.
Horst et al., "Tunable Ring Resonator Dispersion Compensators Realized in High-Refractive-Index Contrast SiON Technology", IBM Research, Zurich Research Laboratory, CH-8803, ECOC2000, PD Topic 2,2.2.

(Continued)

*Primary Examiner*—Dzung D Tran
(74) *Attorney, Agent, or Firm*—Staas & Halsey LLP

(57) ABSTRACT

The automatic dispersion compensation device of the present invention comprises a unit measuring the transmission quality of incoming optical signals for one or more channels input from a transmission line and a unit separating and detecting the transmission quality degradation due to chromatic dispersion, in the measurement result of the unit from degradation due to other factors and controlling a variable chromatic dispersion compensator (VDC) in such a way as to compensate for that degradation.

17 Claims, 54 Drawing Sheets

OTHER PUBLICATIONS

Fells et al., "Twin Fibre Grating Adjustable Dispersion Compensator for 40 Gbit/s", Nortel Networks, ECOC2000, PD Topic 2,2.4.
Winters et al., "Optical equalization of polarization dispersion", AT&T Bell Laboratories, SPIE, vol. 1787, 1992, pp. 346-357.
Takahashi et al., "Automatic compensation technique for timewise fluctuating polarization mode dispersion in in-line amplifier systems", Electronic Letters, vol. 30, No. 4, 1994, pp. 348-349.
Ono et al., "Polarization Control Method for Suppressing Polarization Mode Dispersion Influence in Optical Transmission Systems", IEEE Journal of Lightwave Technology, vol. 12, No. 5, May 1994, pp. 891-898.
Akiyama et al., "Automatice Dispersion Equalization in 40 Gbit/s Transmission by Seamless-Switching Between Multiple Signal Wavelengths", ECOC'99, 1999, pp. I-150-151.
Kawabata, Shuichi, "Method of Displaying and Measuring Polarization State", Optronics, vol. 5, 1997, pp. 109-117.
Kikuchi et al.,"Polarization-Mode Dispersion (PMD) Detection Sensitivity of Degree of Polarization Method for PMD Compensation", ECOC'99, 1999, pp. II-8-9.
Office Action for Chinese Patent Application No. 03138571.0; Jun. 10, 2005.
European Search Report for EP 03 01 1116; Jun. 30, 2005.

* cited by examiner

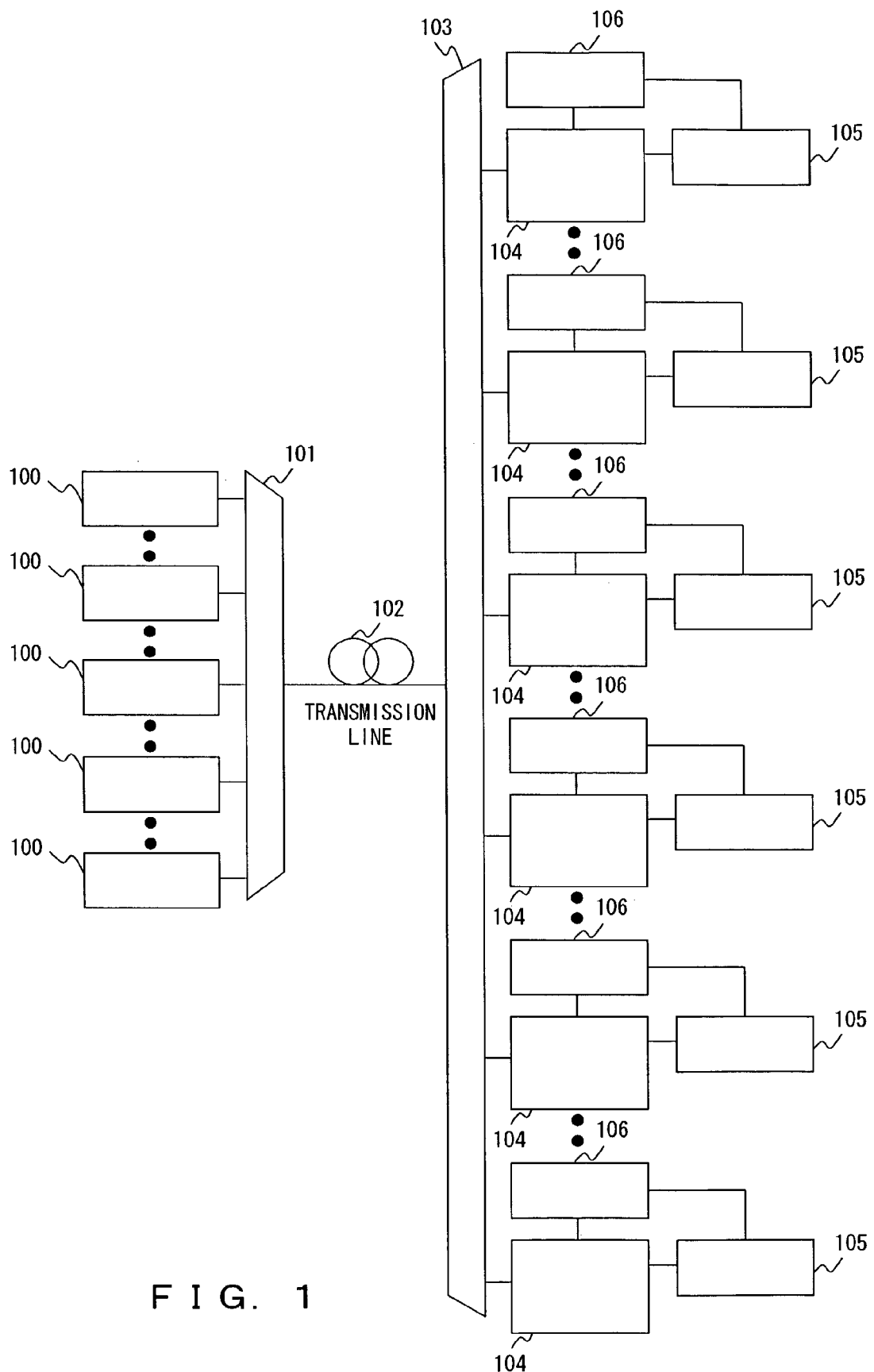
F I G. 1

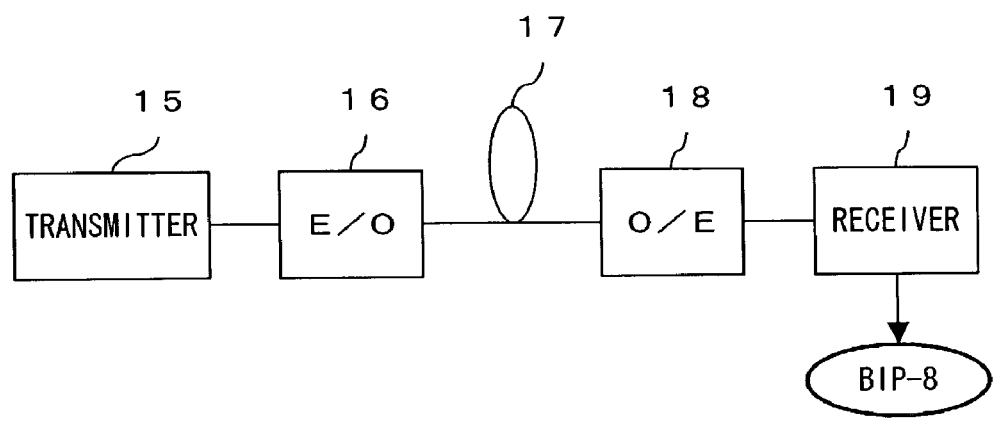
F I G. 6

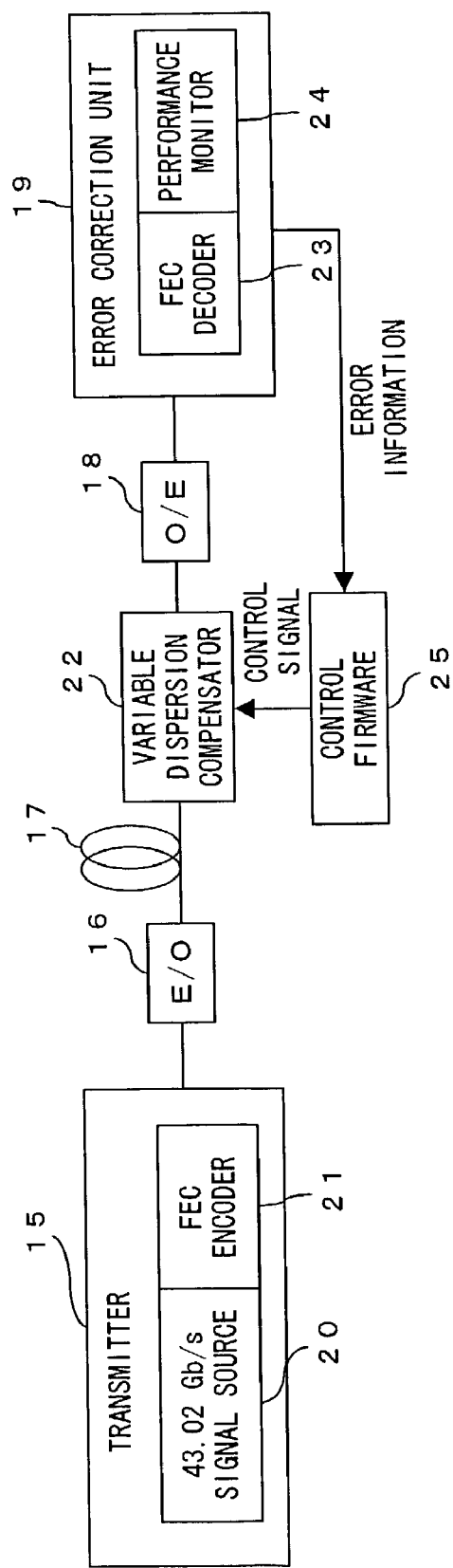
F I G. 7

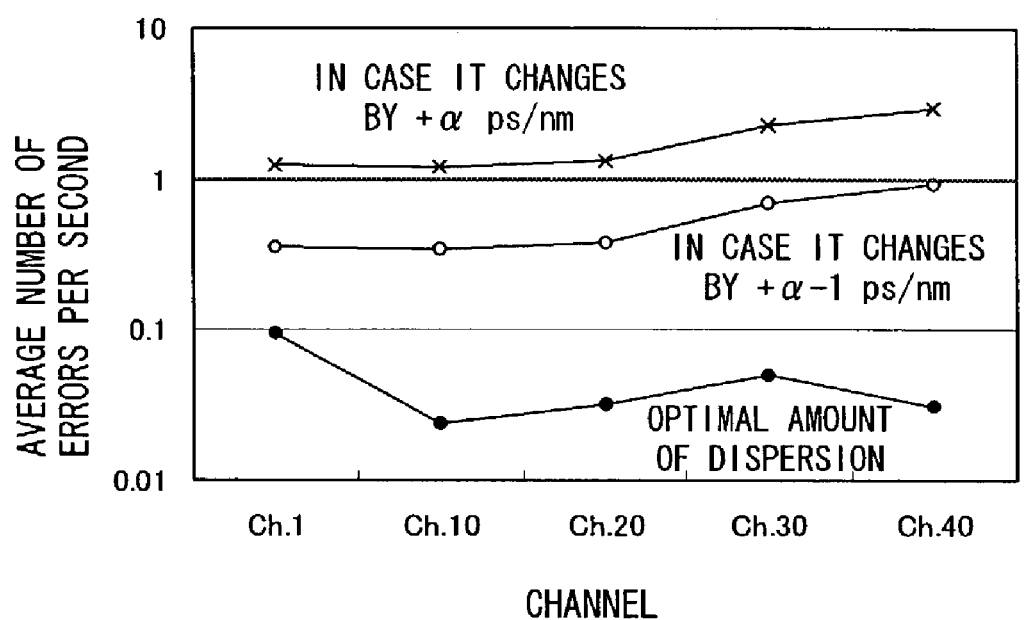
F I G. 1 4

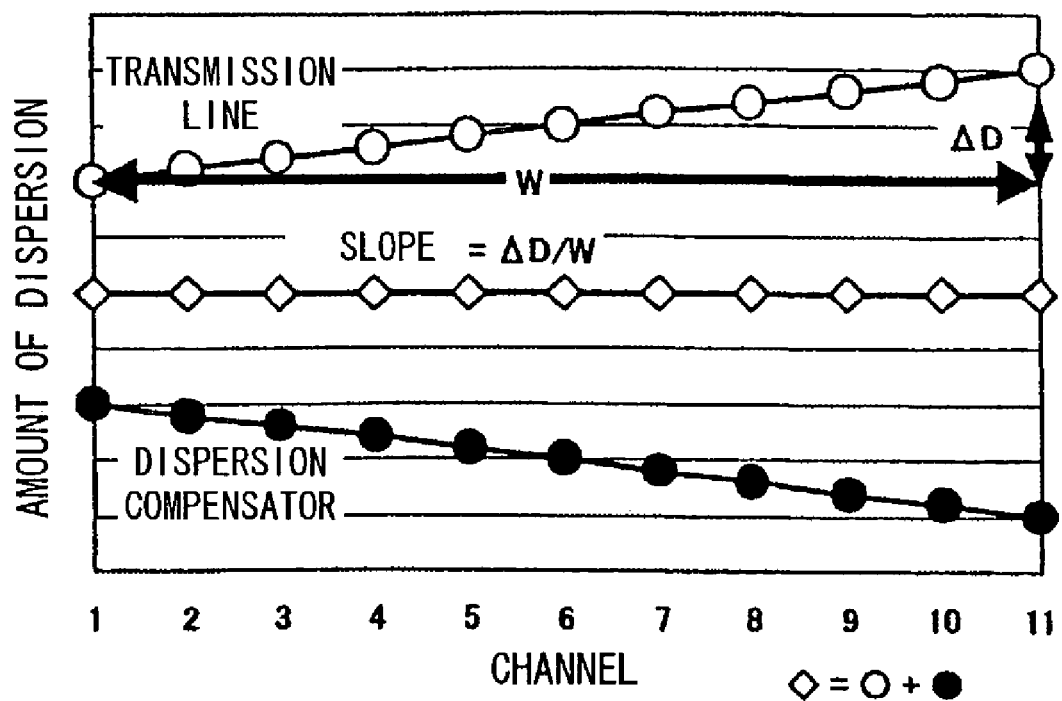
F I G. 1 9

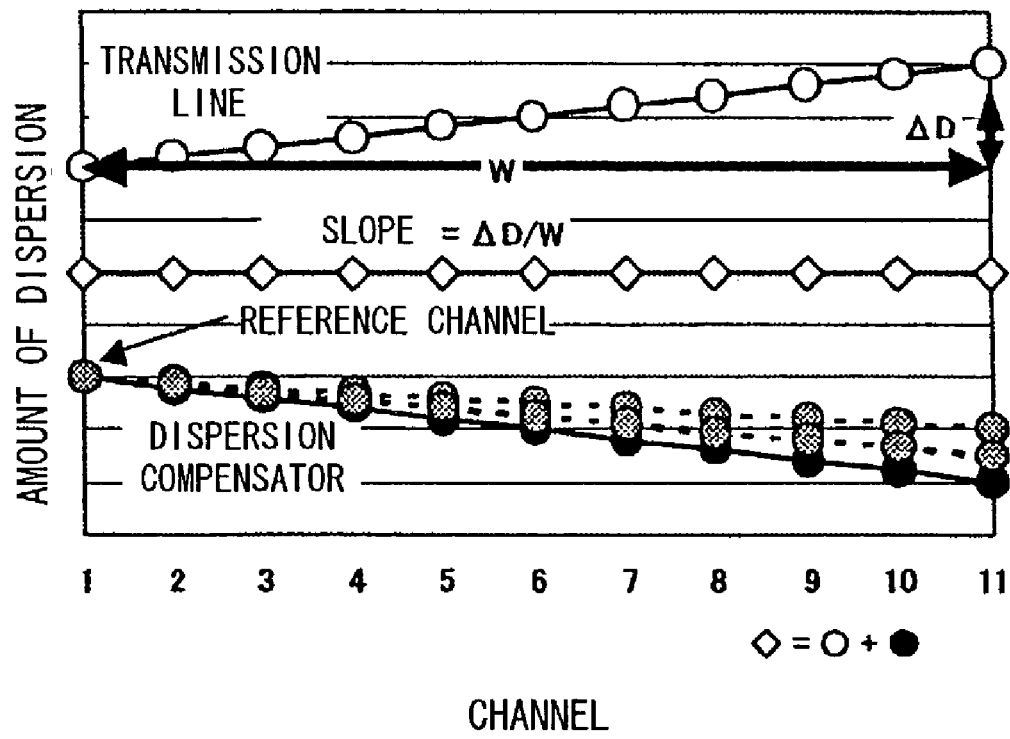
F I G. 2 1

| Ch. | 1 | 10 | 20 | 30 | 40 |
|---|---|---|---|---|---|
| AMOUNT OF CHROMATIC DISPERSION (ps/nm) | -2 | -1 | 0 | +1 | +2 |

FIG. 24

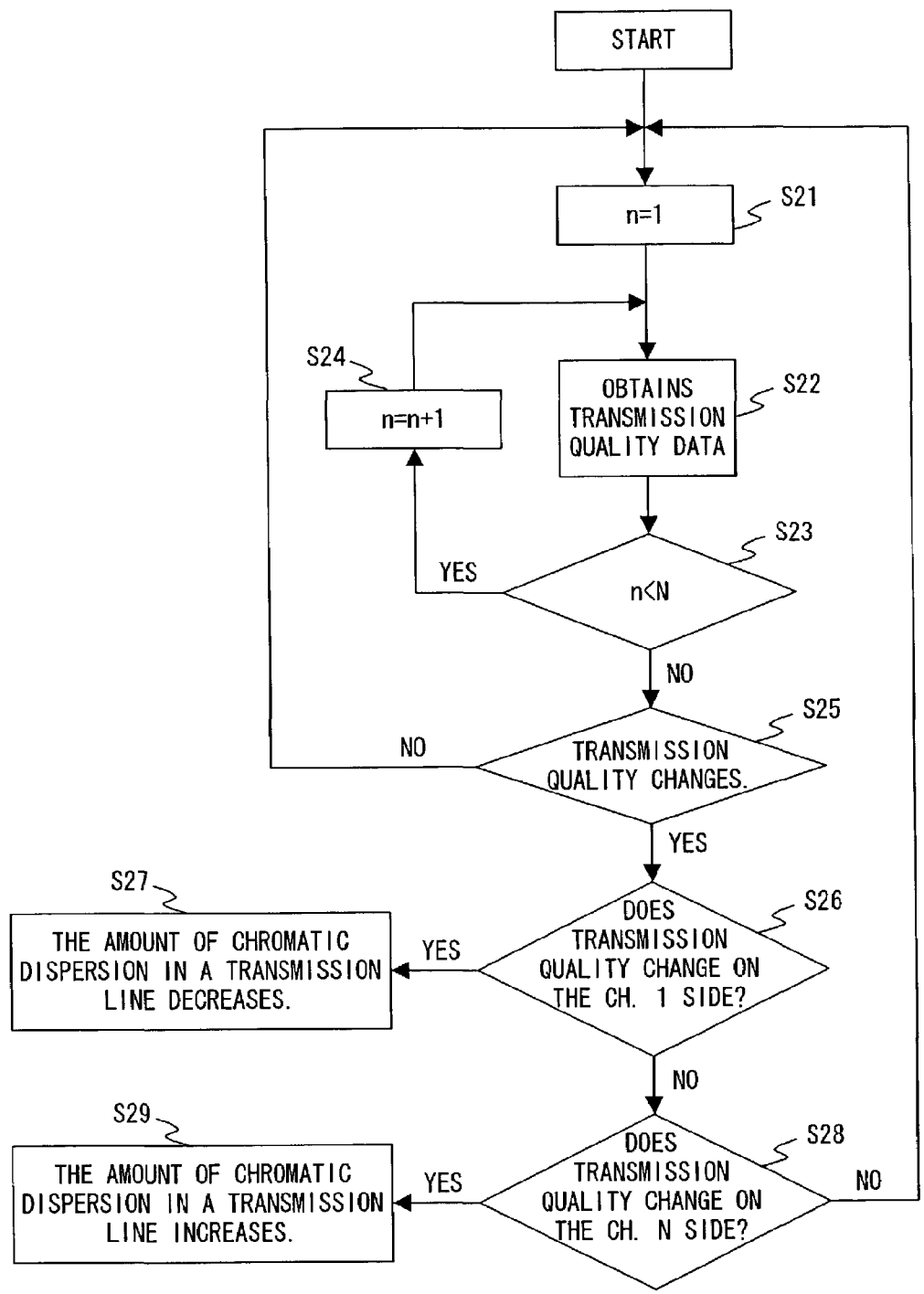
F I G. 3 8

| COMPONENTS | EXAMPLES OF CHARACTERISTIC ITEMS |
|---|---|
| PD | BIAS CURRENT |
| | INPUT OPTICAL POWER |
| EQUALIZER AMPLIFIER | POWER SUPPLY VOLTAGE |
| | TEMPERATURE |
| | OUTPUT AMPLITUDE |
| DECISION CIRCUIT | POWER SUPPLY VOLTAGE |
| | TEMPERATURE |
| | DECISION THRESHOLD (REFERENCE POTENTIAL) |
| | DECISION PHASE |

FIG. 43

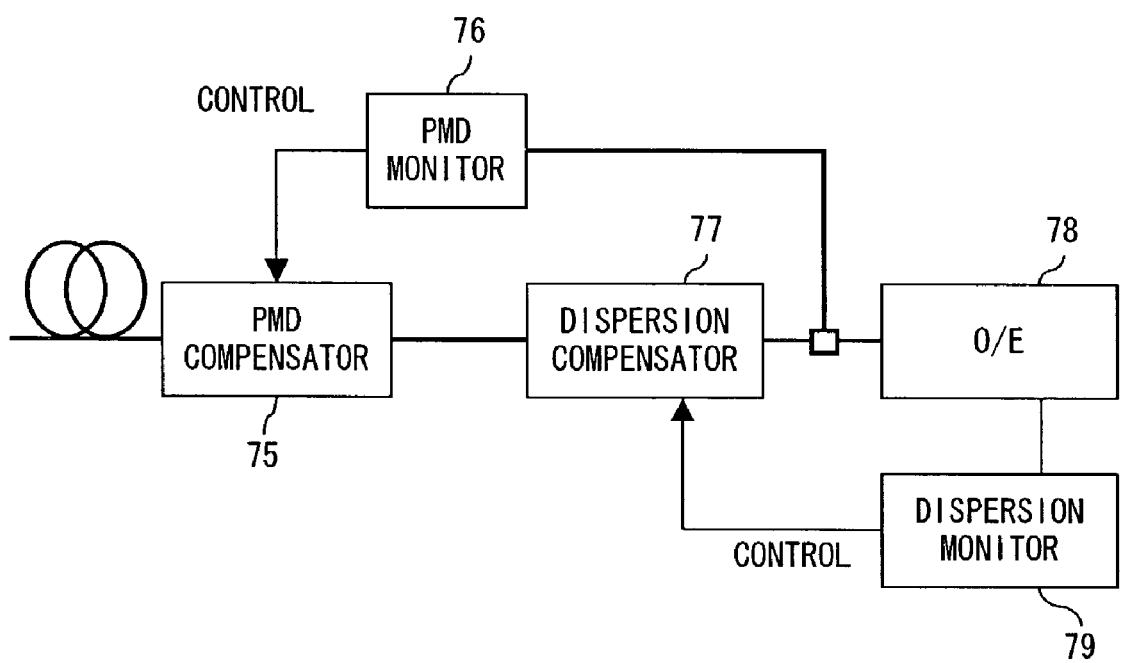
F I G. 4 6

|  | PMD | CHROMATIC DISPERSION |
|---|---|---|
| DEPENDENCE BETWEEN CHANNELS | NO | YES |
| CHANGE SPEED | FAST (FIBER TOUCH) SLOW (DUE TO TEMPERATURE CHANGE) | SLOW (DUE TO TEMPERATURE CHANGE) |

FIG. 49

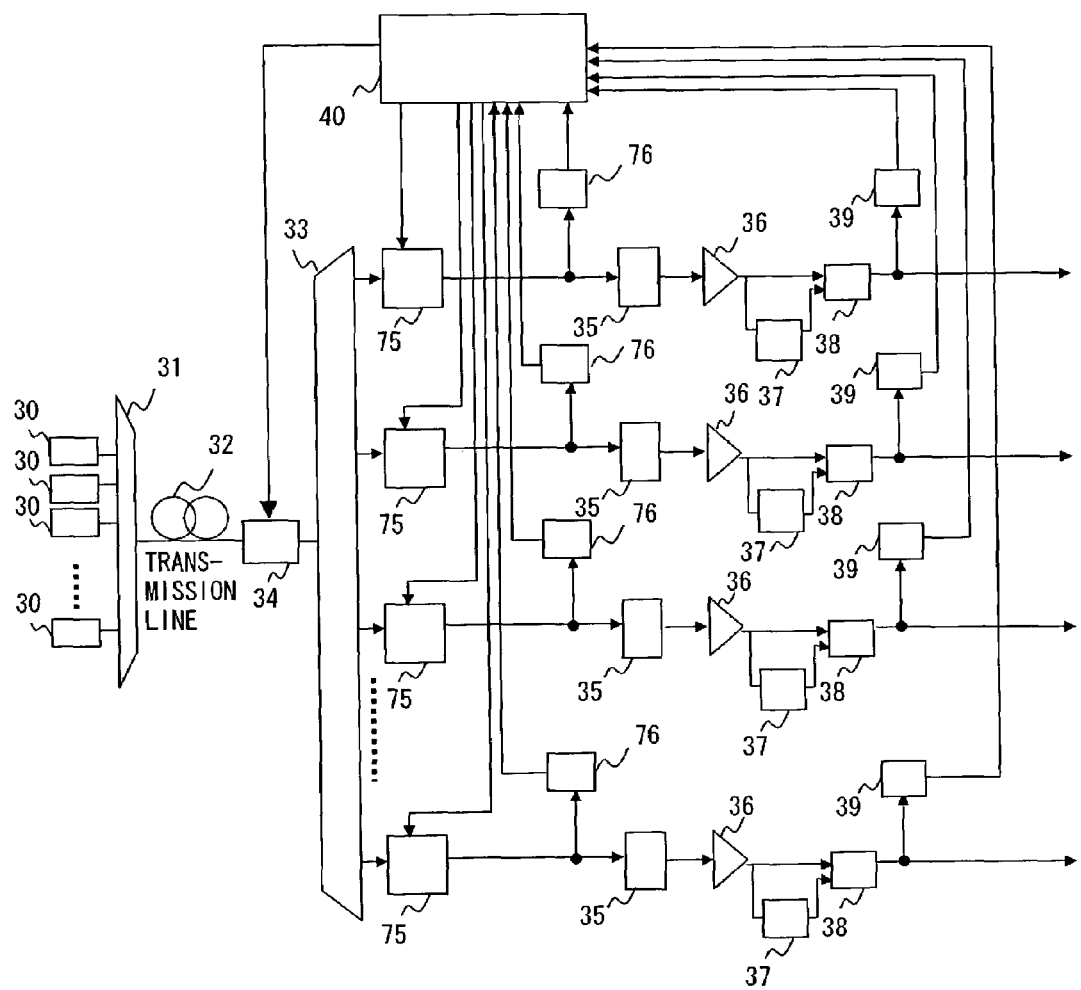
75 PMD COMPENSATOR
76 PMD MONITOR
F I G. 50

75 PMD COMPENSATOR
76 PMD MONITOR

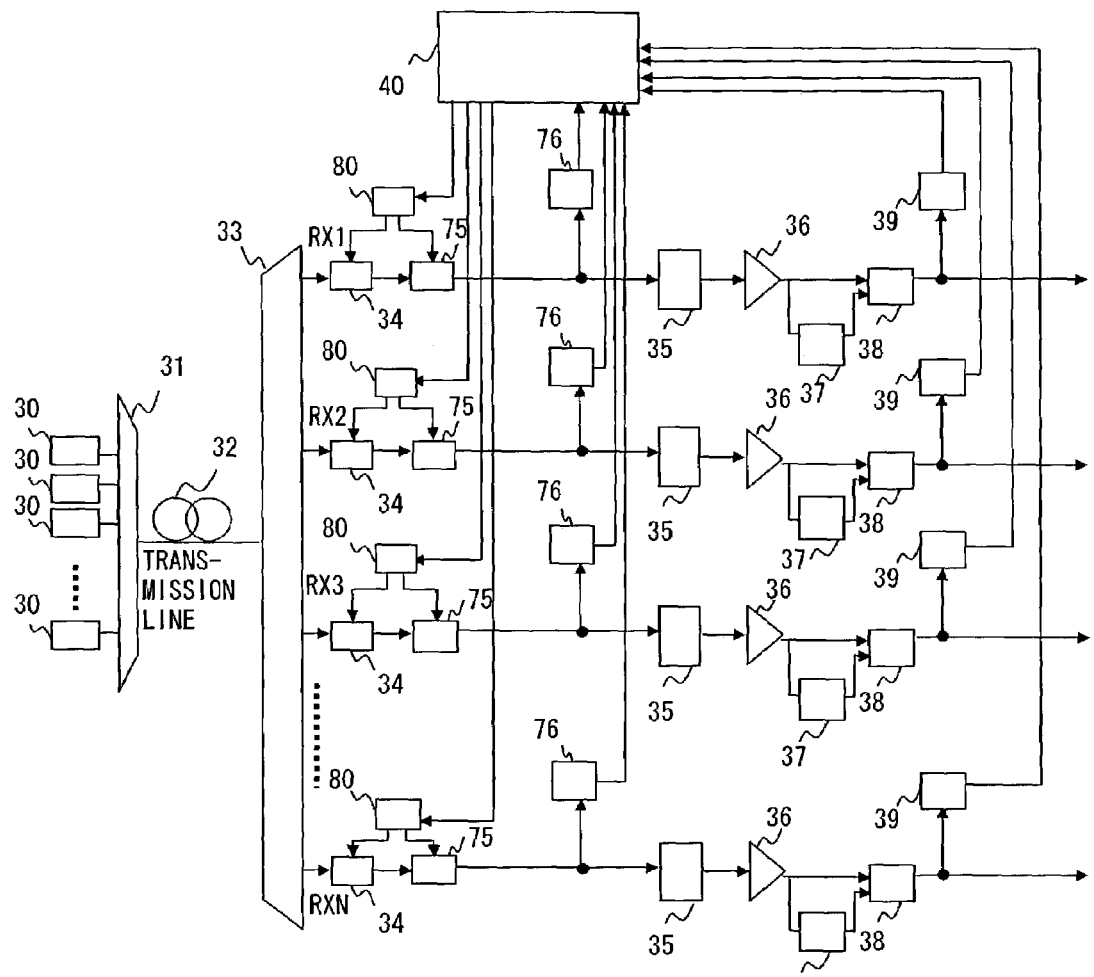
75 PMD COMPENSATOR
76 PMD MONITOR
80 CONTROL CIRCUIT
F I G. 5 2

AUTOMATIC DISPERSION COMPENSATION DEVICE AND COMPENSATION METHOD

BACKGROUND OF THE INVENTION

1. Field of the Invention

The present invention relates to an optical communication system, and more specifically, it relates to a chromatic dispersion compensation technology as an indispensable technology for realizing an ever-progressing large-capacity, high-speed and long-haul optical communication system. In particular, it relates to an automatic dispersion compensation device optimally compensating for chromatic dispersion and polarization-mode dispersion in a transmission line and a compensation method thereof.

2. Description of the Related Art

Recently, although the network capacity has increased rapidly, demand for an even larger capacity of the network has also been grown. Although currently a wavelength division multiplexing (WDM) optical communication method based on a transfer rate of 10 Gb/s per channel is already put into practical use, a far larger capacity is needed in the future. In these situations, the improvement of frequency usage efficiency and the realization of an ultra-high-speed optical communication system with a transfer rate of 40 Gb/s per channel or more are expected from the viewpoint of equipment cost and size.

However, since in such an ultra-high-speed optical communication system, the influence on the transmission quality, that is, transmission waveform degradation due to chromatic dispersion and polarization-mode dispersion, increases, thus limiting the transmission distance of optical signals, which is a problem. For this reason, a highly accurate compensation method is needed for chromatic dispersion and polarization-mode dispersion to realize such an ultra-high-speed optical communication system. Both chromatic dispersion and polarization-mode dispersion are described below.

(1) Chromatic Dispersion

In an optical communication system with a transfer rate of more than 10 Gb/s, a tolerance for chromatic dispersion is remarkably small. For example, the chromatic dispersion tolerance of a 40 Gb/s non-return-to-zero (NRZ) system is 100 ps/nm (pico-sec/nm) or less.

Generally, the repeater spacing of an optical communication system is not constant. For this reason, if, for example, 1.3 μm zero-dispersion single mode fiber (SMF) with a chromatic dispersion value of 17 ps/nm/km is used, chromatic dispersion deviates from its tolerance threshold when repeaters are apart by only several kilo-meters.

On the other hand, since the distance between repeaters and the chromatic dispersion value of an optical fiber transmission line possessed by a communication carrier are not accurately known, it is often difficult to realize highly accurate chromatic dispersion compensation using a fixed-chromatic dispersion compensation method adopting a dispersion compensated fiber (DCF) and the like.

Furthermore, since a chromatic dispersion value varies depending on fiber temperature, stress and the like, as time elapses, the amount of chromatic dispersion of each span must be optimally adjusted by strictly measuring chromatic dispersion not only at the time of the start of the system operation but also during the system operation. For example, if the type of an optical fiber, the length of a transmission line and temperature fluctuation are DSF, 500 km and 100° C., respectively, the following equation holds true.

[Amount of wavelength dispersion]=[Temperature dependence of zero-dispersion wavelength]×[Amount of temperature change in transmission line]×[Dispersion slope of transmission line (Dispersion slope is the chromatic dependence of chromatic dispersion)]×[Transmission distance]
=0.03 nm/° C.×100° C.×0.07 ps/nm$^2$/k×500 km=105 ps/nm This value is almost equivalent to the chromatic dispersion tolerance threshold of a 40 Gb/s NRZ signal. Therefore, an automatic wavelength compensation system, always monitoring the chromatic dispersion value in a transmission line and optimally controlling the amount of wavelength compensation, is indispensable not only in an SMF transmission line but also in a system using a 1.55 μm zero-dispersion shift fiber (DSF) or an NZ (non-zero)-DSF for a transmission line.

(2) Polarization-Mode Dispersion

Next, polarization mode dispersion (PMD) is described.

PMD is dispersion due to the respective different propagation delay times of the polarization elements (two pieces of mode light: for example, a TE mode light and TM mode light) of an optical signal, and it can occur in all types of optical fibers.

Generally, the larger the amount of an optical signal is or the longer the transmission distance of an optical signal is, the greater the influence of polarization mode dispersion becomes, which cannot be neglected. It is said that an optical fiber constituting an old optical transmission line, mainly laid in countries other than Japan, has a large PMD value exceeding 1 ps/km$^{1/2}$ (pico-sec/km$^{1/2}$: one pico is $10^{-12}$) per unit length. Even when short-haul transmission (for example, 50 km transmission) is conducted using such an optical fiber, an optical delay difference ($\Delta\tau$) for one time slot of 25 ps of a 40 Gb/s NRZ signal is 7 ps or more. Therefore, the influence of polarization-mode dispersion is also not negligible as in the case of chromatic dispersion described above. In reality, since components causing polarization-mode dispersion, such as an optical amplifier, a chromatic dispersion compensator and the like, must be installed in the transmission line of an optical communication system, there is a possibility that the transmission distance of an optical signal will be further limited. Furthermore, since polarization-mode dispersion varies depending on stress or temperature change that are placed on an optical fiber as time elapses, the state of polarization-mode dispersion must be monitored and be dynamically compensated for not only at the time of the construction of a system but also during the operation.

As described above, chromatic dispersion and polarization-mode dispersion are major factors for limiting the performance of an optical communication system. In order to improve the performance of an optical communication system, an automatic dispersion compensation system individually and dynamically compensating for both chromatic dispersion and polarization-mode dispersion must be provided.

Three element technologies needed to realize such an automatic dispersion compensator are as follows:

(a) Realization of a variable chromatic dispersion compensator (b) Realization of chromatic dispersion monitoring in a transmission line (c) Realization of a feedback optimal control method for a variable chromatic dispersion compensator (However, at the following (c) is not described.)

As for the chromatic dispersion compensator of (a), for example, the following items are proposed:

(1) VIPA (Virtually Imaged Phased Array)

"Variable Dispersion Compensator Using the Virtually Imaged Phased Array (VIPA) for a 40 Gbit/s WDM Transmission System", ECOC2000, PD Topics 2, 2.3.

(2) Tunable Ring Resonator

"Tunable Ring Resonator Dispersion Compensators realized in High Refractive-index Contrast Technology", ECOC2000, PD Topic 2, 2.2.

(3) FBG (Fiber Bragg Grating)

"Twin Fiber Grating Adjustable Dispersion Compensator for 40 Bbit/s", ECOC2000, PD Topic 2, 2.4.

As for the polarization-mode dispersion compensator, for example, the following items are proposed:

(1) A method for controlling a polarization controller (PC), in such a way that the optical intensity divergence ratio γ of two polarization modes is 0 or 1, by providing an optical signal transmitting terminal with the PC and feeding back a transmission characteristic from the receiving terminal, "Optical Equalization of Polarization Dispersion", SPIE Vol. 1, 1787, Multigigabit fiber Communications (1992), pp. 346-357.

(2) A method for causing a delay difference between two polarization modes, with a sign that is the reverse of that of an optical transmission line, by providing an optical signal receiving terminal with a polarization controller and a polarization maintaining fiber (PMF), and controlling the polarization controller, "Automatic Compensation Technique for Timewise Fluctuating Polarization Mode Dispersion in In-line Amplifier Systems", Electro, Lett., Vol. 30, No. 4, 994, pp. 348-349.

(3) A method for controlling a polarization controller and a variable delay element by providing a polarization controller and a polarization beam splitter (PBS), wherein two optical receivers each receiving one of two optical signal elements, split by this polarization beam splitter, and a variable delay element which causes a delay difference between two electrical signals obtained from these optical receivers, "Polarization Control Method for Suppressing Polarization Mode Dispersion Influence in Optical Transmission Systems", J. of Lightwave Technol., Vol. 12, No. 5 (1994), pp. 891-898.

Next, several methods are also proposed for chromatic dispersion monitoring in a transmission line (b) that is indispensable for feedback control.

Firstly, as a method for measuring chromatic dispersion values, a pulse method for inputting a plurality of rays each with a different wavelength to an optical fiber, and a method measuring the group delay between output rays or the phase difference have been conventionally proposed. However, in order to be able always to measure chromatic dispersion without communication quality degradation during the system operation, (1) one set of chromatic dispersion measuring instruments is needed for each repeater section and (2) the measurement of light with a wavelength different from that of the data signal must be wavelength-multiplexed, both of which are problems. It is not practical from the viewpoints of economical efficiency and device size to realize such measures.

As examples of such achromatic dispersion monitor for solving these problems, several methods are proposed. Examples of such a chromatic dispersion monitor are described below.

(1) A method using the intensity of a specific frequency element of an incoming base-band signal utilizing the property that the intensity of a specific frequency element changes due to waveform distortion, ("Automatic Dispersion Equalization in 40 Gbit/s Transmission by Seamless-switching between Multiple Signal Wavelengths", ECOC'99, pp. I-150-151.

(2) A method using an error rate

A method for monitoring an error rate using a receiver and feedback which controls a chromatic dispersion compensator in such a way that the error rate becomes optimized ("Optical Fiber Communication System Incorporating an Automatic Dispersion Compensation Module Compensating for the Fluctuations of Dispersion Due to Temperature", Japanese Patent Laid-open No. 2001-77756 (P2001-77756A) and "Automatic Equalization System", Japanese Patent Laid-open No. 9-326755)

As a method for measuring polarization-mode dispersion, the following items are proposed:

(1) Modulated Phase-Shift Method
(2) Jones Matrix Eigen Analysis method
(3) Poincare' Sphere Analysis method
(4) Interferometric method As a method for displaying (expressing) a polarization state, the following are proposed ("Method for Displaying and Measuring Polarization State", Optronics (1997), No. 5, pp. 109-117):

(1) Poincare sphere
(2) Jones' vector
(3) Stokes' vector

A method for measuring polarization-mode dispersion using Jones' vector and a device thereof are proposed in Japanese Patent Laid-open No. 9-72827 as one example. A polarization dispersion monitor monitoring a specific frequency element of an incoming signal is also proposed although it is difficult to apply it in an environment where there is chromatic dispersion.

Any practical chromatic dispersion monitor directly or indirectly uses waveform distortion due to dispersion. In this case, if there are simultaneously chromatic dispersion and polarization-mode dispersion, waveform distortion due to these two forms of dispersion cannot be distinguished. Therefore, it is difficult to realize an automatic dispersion compensator simultaneously compensating for both chromatic dispersion and polarization-mode dispersion.

Furthermore, if an already-proposed parameter indicating transmission quality, such as an error rate and the like, is used instead of a chromatic dispersion monitor, it is difficult to separate the degradation of transmission quality due to chromatic dispersion from that due to factors other than it. Therefore, in this case, factors for transmission quality degradation are not separated and control is exercised as if a chromatic dispersion compensator could compensate for transmission quality degradation due to all factors. However, since there are various factors of transmission quality degradation, having only a chromatic dispersion compensator means that it cannot always compensate for all transmission quality degradation. Therefore, there is no guarantee that optimal control can be always exercised, and furthermore sometimes there will be no control.

If in this way, a chromatic dispersion compensator is operated without separating the factors of transmission quality degradation, optimal control cannot be guaranteed and sometimes there is no control. Such a case is described below with reference to FIGS. 1 through 3.

FIG. 1 shows the entire configuration of a conventional optical communication system used to describe the problems. In FIG. 1, a multiplexer 101 multiplexes the outputs of a transmitter TX 100, for each channel (100 GHz interval between channels) from channel 1 (196 THz) to channel 40

(192.1 THz), and transmits it to a receiver through a transmission line of, for example, 90 km. It is assumed that dispersion in the transmission line is 5.0 ps/nm/km for channel 1 and the dispersion slope is 0.06 ps/nm$^2$/km.

On the receiver side, a demultiplexer 103 demultiplexes signals for each channel, and a variable chromatic dispersion compensator (VDC) 104 compensates for the chromatic dispersion of signals in each channel. Then, the VDC 104 transmits these signals to a receiver RX 105. Then, a monitor/controller 106 monitors the transmission quality of the received result and controls the VDC 104. In the following description, the non-linear effect of a fiber is neglected for conveniences' sake and the number of errors experienced is used as the amount of monitoring of the monitor/controller 106.

FIG. 2 shows the relation between the average number of errors per second and the residual amount of chromatic dispersion obtained when the decision threshold and decision phase of the receiver is optimized. If the allowable number of, penalties of error due to chromatic dispersion is 1, dispersion tolerance is approximately 98 ps/nm.

The case where the deviation of the decision threshold of the receiver is one factor for transmission quality degradation, other than chromatic dispersion, that is studied. FIG. 3 shows the relation between the number of errors and the residual amount of chromatic dispersion of the decision threshold in which there are errors with the allowable number of errors equal to 1.

Compared with FIG. 2, in FIG. 3, there is no control and it is difficult to detect an optimal chromatic dispersion value. In other words, in such a situation, the control of only a dispersion compensator cannot realize a transmission that matches the allowable number of errors.

If there is transmission quality degradation due to factors other than chromatic dispersion, no operation of a chromatic dispersion compensator is actually needed. Therefore, in order to control a chromatic dispersion compensator using a transmission quality monitor, the factors causing transmission quality degradation must be separated, which is a problem.

SUMMARY OF THE INVENTION

It is an object of the present invention to provide an automatic dispersion compensation device compensating for transmission quality degradation by separating the factors causing the transmission quality degradation using a transmission quality monitor instead of a chromatic dispersion monitor, and a compensation method thereof in order to solve the problems associated with transmission.

The present invention is an automatic dispersion compensation device with a variable chromatic dispersion compensator applied to optical signals input from an optical transmitter transmitting the optical signals from a plurality of channels, through a transmission line. The automatic dispersion compensation device comprises a transmission quality measurement unit measuring the transmission quality of the optical incoming signals for each of the plurality of channels; and a chromatic dispersion compensation amount control unit for separating and detecting transmission quality degradation, due to chromatic dispersion in the transmission line, in the measurement result of the transmission quality measurement unit from degradation due to other factors and controlling the variable chromatic dispersion compensator in such a way as to compensate for the degradation.

According to the present invention, optimal control of chromatic dispersion in a transmission line can be exercised in order to influence communication quality using a general-purpose transmission quality monitor instead of a special dispersion monitor, and system performance can thus be improved.

BRIEF DESCRIPTION OF THE DRAWINGS

FIG. 1 shows the entire configuration of a conventional optical communication system;

FIG. 6 shows a transmission quality monitoring method in a SONET/SDH system;

FIG. 7 shows a transmission quality monitoring method using an error correction code;

FIG. 14 shows the change in the number of errors caused when the chromatic dispersion of a transmission line increases;

FIG. 19 shows a dispersion slope compensation method;

FIG. 21 shows the first dispersion slope optimization method;

FIG. 24 shows the slope of the chromatic dispersion values shown in FIG. 23;

FIG. 38 is a flowchart showing the decision process for the increase/decrease of chromatic dispersion in a transmission line;

FIG. 43 shows an example of monitoring items in a receiver;

FIG. 46 shows an example basic configuration of a compensation system in the fourth preferred embodiment (No. 2);

FIG. 49 shows the respective influences on transmission quality by chromatic dispersion and polarization-mode dispersion;

FIG. 50 shows an example configuration of an optical communication system in the fourth preferred embodiment (No. 1);

FIG. 52 shows an example configuration of an optical communication system in the fourth preferred embodiment (No. 3);

DESCRIPTION OF THE PREFERRED EMBODIMENTS

The preferred embodiments of the present invention are described below with reference to the drawings.

Figure 2:
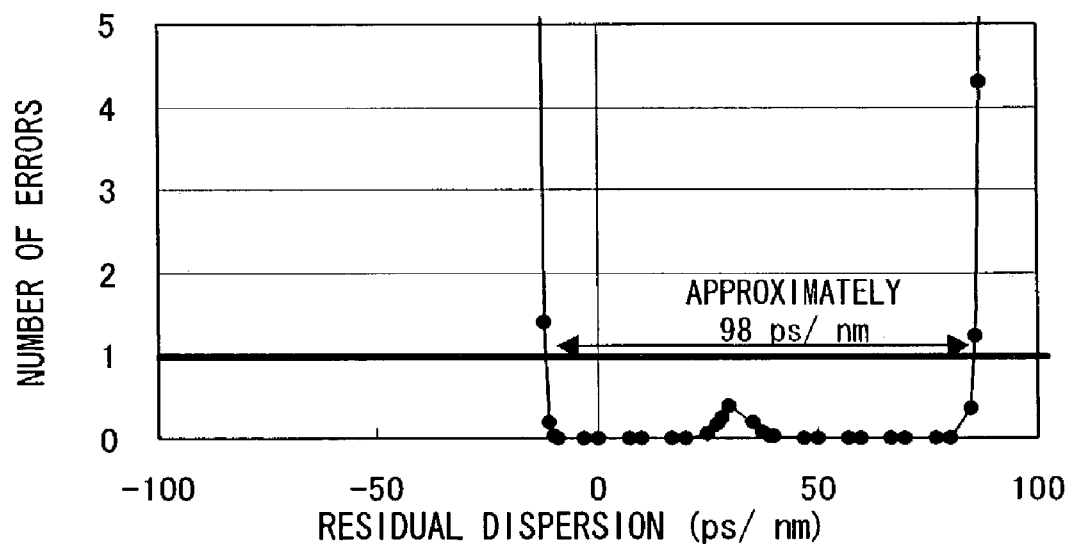
FIG. 2 shows the transmission characteristic of the system shown in FIG. 1 obtained when a decision threshold and the like are optimized.
Figure 3:
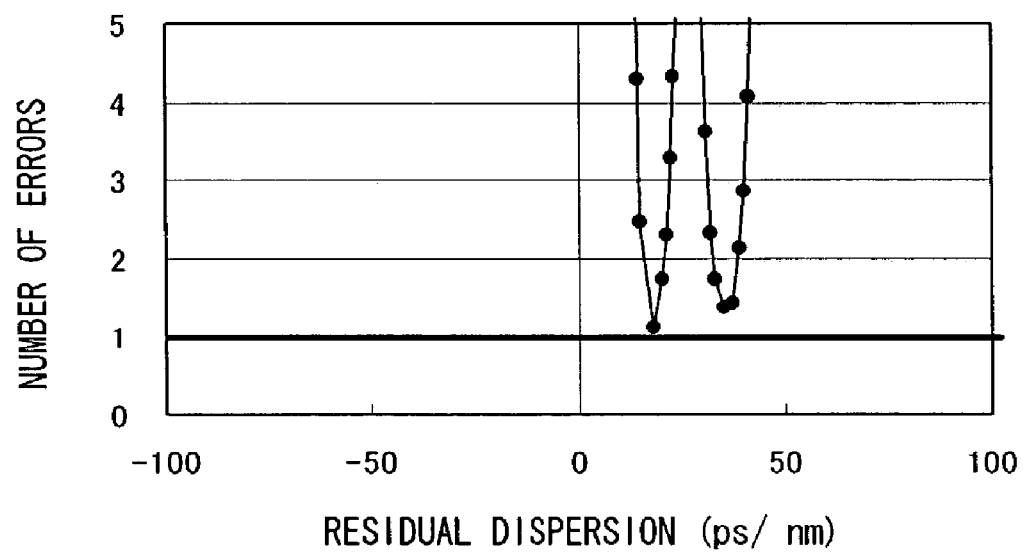
FIG. 3 shows the state of the system shown in FIG. 1, where there is no control.
Figure 4:
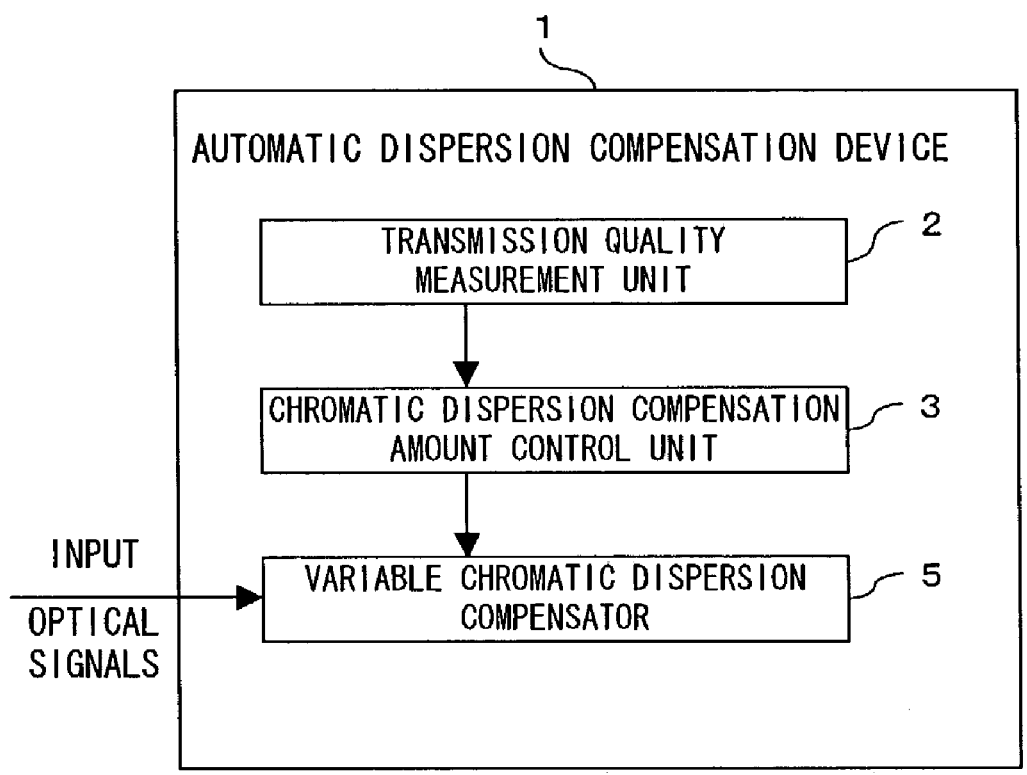
FIG. 4 shows the basic configuration of an automatic dispersion compensation device according to the present invention.

In FIG. 4, an automatic dispersion compensation device 1 comprises a transmission quality measurement unit 2 and a chromatic dispersion compensation amount control unit. The transmission quality measurement unit 2 measures the transmission quality of optical signals from one or more channels. The transmission quality measurement unit 2 is a transmission quality monitor measuring, for example, the Q-factor, that is, the error rate of an incoming optical signal, and the like.

In FIG. 4, an automatic dispersion compensation device 1 comprises a transmission quality measurement unit 2 and a chromatic dispersion compensation amount control unit. The transmission quality measurement unit 2 measures the transmission quality of optical signals from one or more channels. The transmission quality measurement unit 2 is a transmission quality monitor measuring, for example, the 0 value, that is, the error rate of an incoming signal, and the like.

The a chromatic dispersion compensation amount control unit 3 separates and detects, from the measurement result of the transmission quality measurement unit 2, transmission quality degradation due to chromatic dispersion in a transmission line and due to factors other than the chromatic dispersion, and controls the variable chromatic dispersion, compensator 5 in such a way as to compensate for the degradation.

In another preferred embodiment of the present invention, the automatic dispersion compensation device 1 further comprises a residual chromatic dispersion amount increase/decrease unit for increasing/decreasing the difference in the magnitude of dispersion compensation between channel, for any residual amount of chromatic dispersion obtained as a result of compensation by the variable chromatic dispersion compensator 5, depending on the wavelength of an optical signal; and a chromatic dispersion amount increase/decrease judgment unit for comparing the measurement result of transmission quality after compensation by the variable chromatic dispersion compensator and the residual chromatic dispersion amount increase/decrease unit, between channels, and judging whether the amount of chromatic dispersion in the transmission line increases or decreases.

In this case, for example, the residual chromatic dispersion amount increase/decrease unit can increase/decrease the amount of chromatic dispersion compensation for the difference between channels across the entire channel range in such a way as to change it in the form of a slope or step, as chromatic dispersion increases. Alternatively, the residual chromatic dispersion amount increase/decrease unit can increase/decrease the amount of chromatic dispersion compensation in a specific channel range in such a way as to change it in the form of a slope or step.

In another preferred embodiment of the present invention, the automatic dispersion compensation device 1 further comprises a receiver state detection unit detecting the state, such as the voltage and temperature, of each receiver unit receiving optical signals through a transmission line. In this case, the chromatic dispersion compensation control unit 3 can also stop/prevent control by the variable chromatic dispersion compensator in accordance with the detection result of the receiver state detection unit and the measurement result of the transmission quality measurement unit 2.

Furthermore, in another preferred embodiment, the automatic dispersion compensation device 1 further comprises a plurality of polarization-mode dispersion compensators for signals from each channel input of a transmission line, and a plurality of monitors detecting polarization-mode dispersion after compensation by a polarization-mode dispersion compensator in addition to the variable chromatic dispersion compensator. In this case, the chromatic dispersion compensation control unit 3 can also control the variable chromatic dispersion compensator and polarization-mode dispersion compensator in accordance with the timewise change tendency of the measurement result of the transmission quality measurement unit and the detection result of the monitor.

According to the automatic dispersion compensation method of the present invention, the transmission quality of incoming optical signals for one or more channels is measured, where from the measurement result transmission quality degradation, due to chromatic dispersion in a transmission line, is detected and separated from that due to factors other than the chromatic dispersion, and the variable chromatic dispersion compensator is controlled in such a way as to compensate for the degradation.

According to the preferred embodiment of the present invention, for a program used by a computer controlling variable chromatic dispersion, a program for enabling the computer to perform a step of receiving the transmission quality measurement result of the optical signals for each of a plurality of channels, the step of detecting and separating, from the transmission quality measurement result, the transmission quality degradation due to chromatic dispersion in a transmission line and due to other factors and the step of controlling variable chromatic dispersion compensation in such a way as to compensate for the degradation, is used.

According to the present invention, chromatic dispersion change in a transmission line can be compensated for using a general-purpose transmission quality monitor with an existing function instead of a special dispersion monitor.

Figure 5:
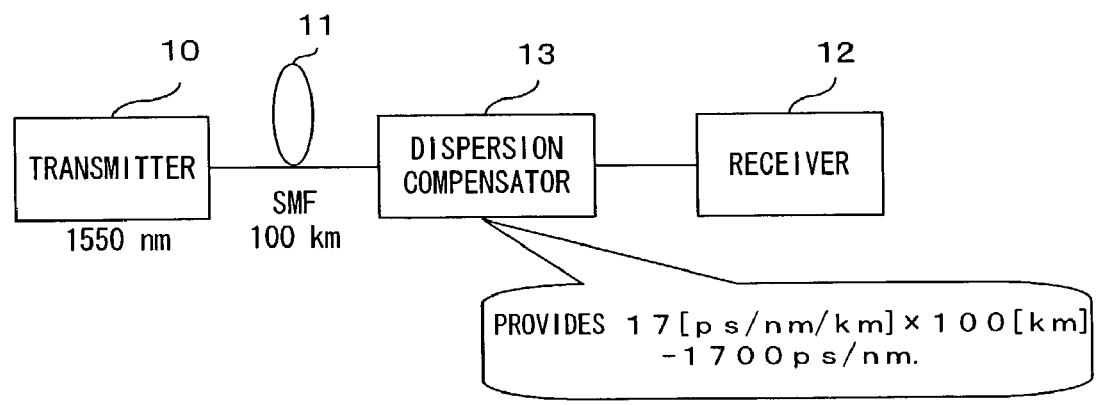
FIG. 5 shows a chromatic dispersion compensation method according to the present invention.

FIG. 5 shows the basic chromatic dispersion compensation method of the present invention. In FIG. 5, optical signals are transmitted from a transmitting transmitter 10 to a receiver 12 through a transmission line 11. In a receiver, a chromatic dispersion compensator is installed before a receiver 12 and chromatic dispersion compensation is carried out there. For example, if the wavelength of the signal and the amount of chromatic dispersion of a 100 km single mode fiber (SMF) are 1,550 nm and 17 ps/nm/km, respectively, the chromatic dispersion in the transmission line can be compensated for by the dispersion compensator 13 supplying an amount of dispersion of −1,700 ps/nm.

In the preferred embodiment, chromatic dispersion is compensated for using a general-purpose transmission quality monitor instead of a special dispersion monitor. In the preferred embodiment, for transmission quality, an error rate or a Q value is used. Such a transmission quality monitor is described below with reference to FIGS. 6 and 7.

FIG. 6 shows the case where in a SONET/SDH (synchronous optical network/synchronous digital hierarchy) system, an 8-bit value, called a B1 byte, is used to store information about operation/maintenance overhead.

In FIG. 6, signals from a transmitter 15 are converted into optical signals by an electrical/optical converter (E/O) 16 and are transmitted to a receiver, through a transmission line 17. On the receiver side, the optical signals are converted into electrical signals by an optical/electrical converter (O/E) 18 and are supplied to the receiver 19. The B1 byte is used to monitor code errors between regenerator adopting a monitoring method, called BIP-8 (bit interleaved parity 8), or between an intermediate regenerator and the multiplex regenerator. This can be used by a quality monitor to indicate the quality of transmission signals in the relevant section.

Between terminal stations multiplex regenerator adopting a monitoring method, called BIP-24×N, a B2 byte used to monitor code errors can also be used as a byte indicating transmission quality, and all information can be divided and monitored into a plurality of 24 bits. Therefore, in this case, more detailed error information can be extracted compared with BIP-8.

FIG. 7 shows the case where transmission quality is monitored using an error correction code, that is, by forward error correction (FEC). In FIG. 7, a transmitter 15 comprises a signal source 20 and an FEC encoder 21, and a receiver comprises an FEC decoder 23 as an error correction unit 19 inside the receiver, and a performance monitor 24 calculating the number of error corrections and the like. In this case, error information is supplied to a control firmware 25 and a control signal for a variable dispersion compensator 22 in the receiver is output. In this way, in the preferred embodiment, a general configuration used for code error monitoring and correction in the receiver can be used without modification, instead of a special chromatic dispersion monitor.

Figure 8:
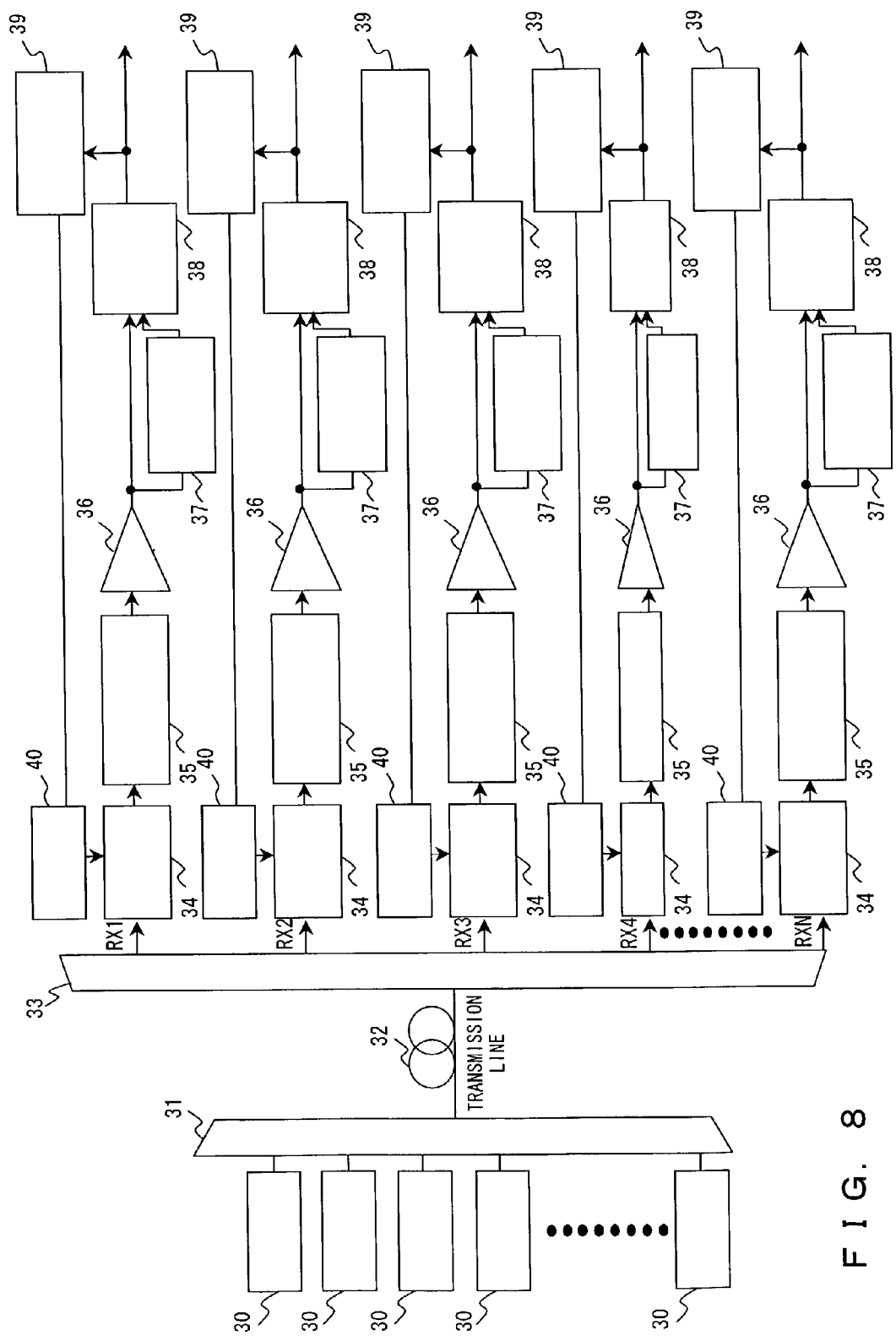
FIG. 8 shows an example configuration of an optical communication system in the first preferred embodiment (No. 1)

FIG. 8 shows an example configuration of the optical communication system in the first preferred embodiment of the present invention (No. 1). In this first preferred embodiment, a dispersion compensator is controlled using the monitoring, result of a transmission quality monitor.

In FIG. 8, the outputs of transmitters (TX1 through TXN) 30 for each channel are multiplexed by a multiplexer 31 and are transmitted to a receiver through a transmission line 32.

In the receiver, incoming signals RX1, RX2 RXN for each channel are demultiplexed by a demultiplexer 33. The dispersion in the transmission line 32 and the like of signals for each channel is compensated for by a dispersion compensator 34, signals for each channel are converted into electrical signals, by an optical/electrical conversion unit 35, and are amplified by an amplifier 36 and are output by a clock extraction circuit 37 and a decision circuit 38, as incoming signals. In FIG. 8, a transmission quality monitor 39 monitors the transmission quality of incoming signals for each channel, and a dispersion compensator 34 for each channel is controlled by a control circuit 40, based on the mentioned result.

Figure 9:
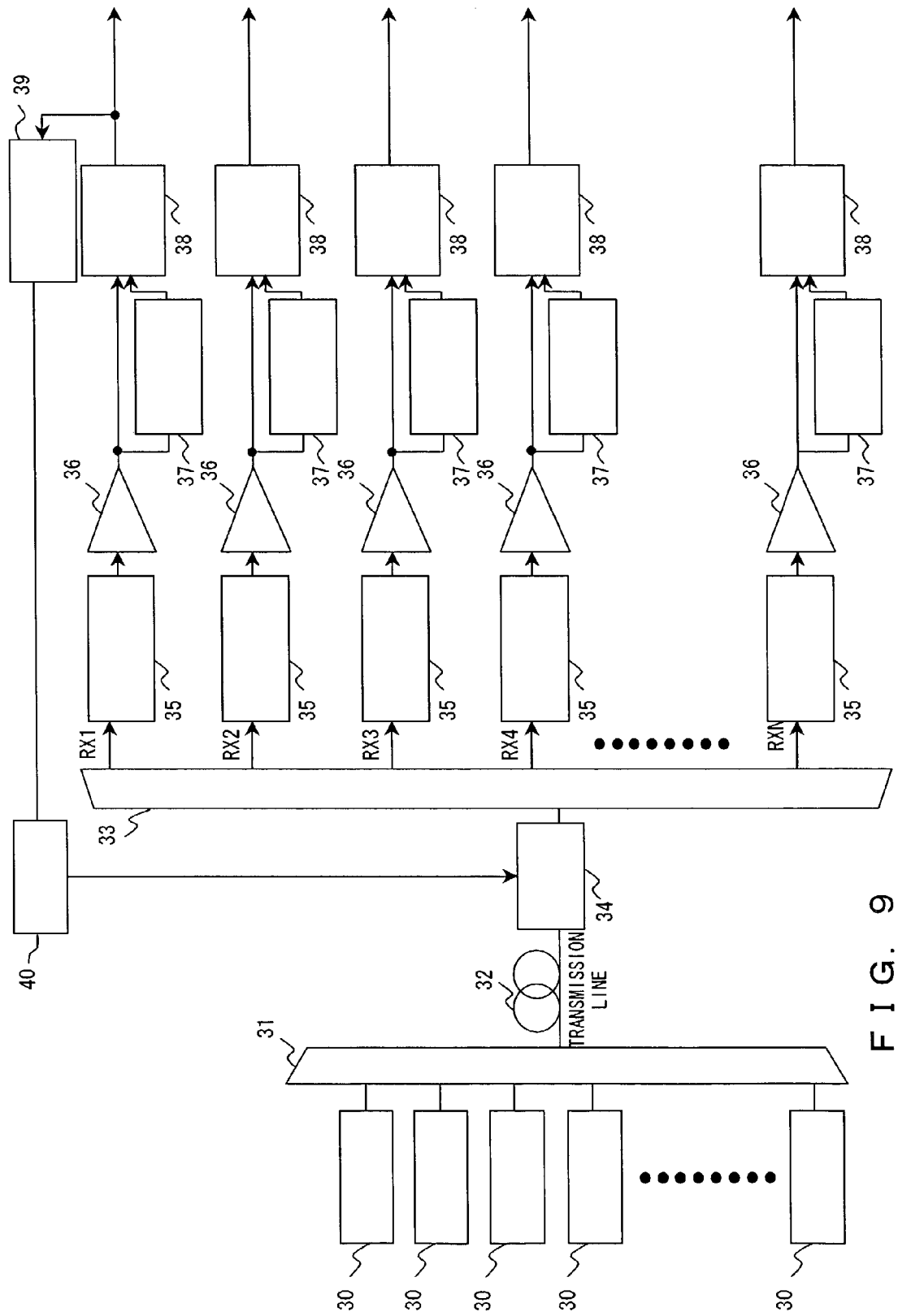
FIG. 9 shows an example configuration of an optical communication system in the first preferred embodiment (No. 2)

FIG. 9 shows an example configuration of the optical communication system in the first preferred embodiment (No. 2). In FIG. 9, in a receiver, a transmission quality monitor 39 monitors the transmission quality of any channel, for example, incoming signals as the output of the identification circuit of one channel, and a control circuit 40 controls a dispersion compensator 34 that is commonly provided for all channels, between a transmission line 32 and a demultiplexer 33, unlike that shown in FIG. 8.

In FIG. 9, only one dispersion compensator 34 is provided immediately after the transmission line 32, and chromatic dispersion is collectively compensated for. Since transmission quality degradation due to chromatic dispersion change in a transmission line basically does not depend on a wavelength, that is, a channel, and that almost the same amount of degradation occurs in any channel, which is described later, such a collective compensation is possible. Compared with the individual compensation method for each channel shown in FIG. 8, although such a collective compensation method has great advantages in cost and device size, sometimes it is difficult to make such collective compensation.

The first reason why it is difficult to make such collective compensation is that one compensator cannot cover such a broad band using a variable chromatic dispersion compensator (VDC). Although some devices, such as VIPA and the like, can periodically cover such a broad band, generally it is difficult for one compensator to cover the entire broadband by its nature.

The second reason is that if a transmission distance is long, it becomes difficult to make collective compensation. The wavelength dependence of chromatic dispersion is called a chromatic dispersion slope. Since an optical fiber has such a dispersion slope in its nature, the slope must also be compensated for, if a transmission distance is long. Accordingly, it is difficult to make collective compensation.

Figure 10:
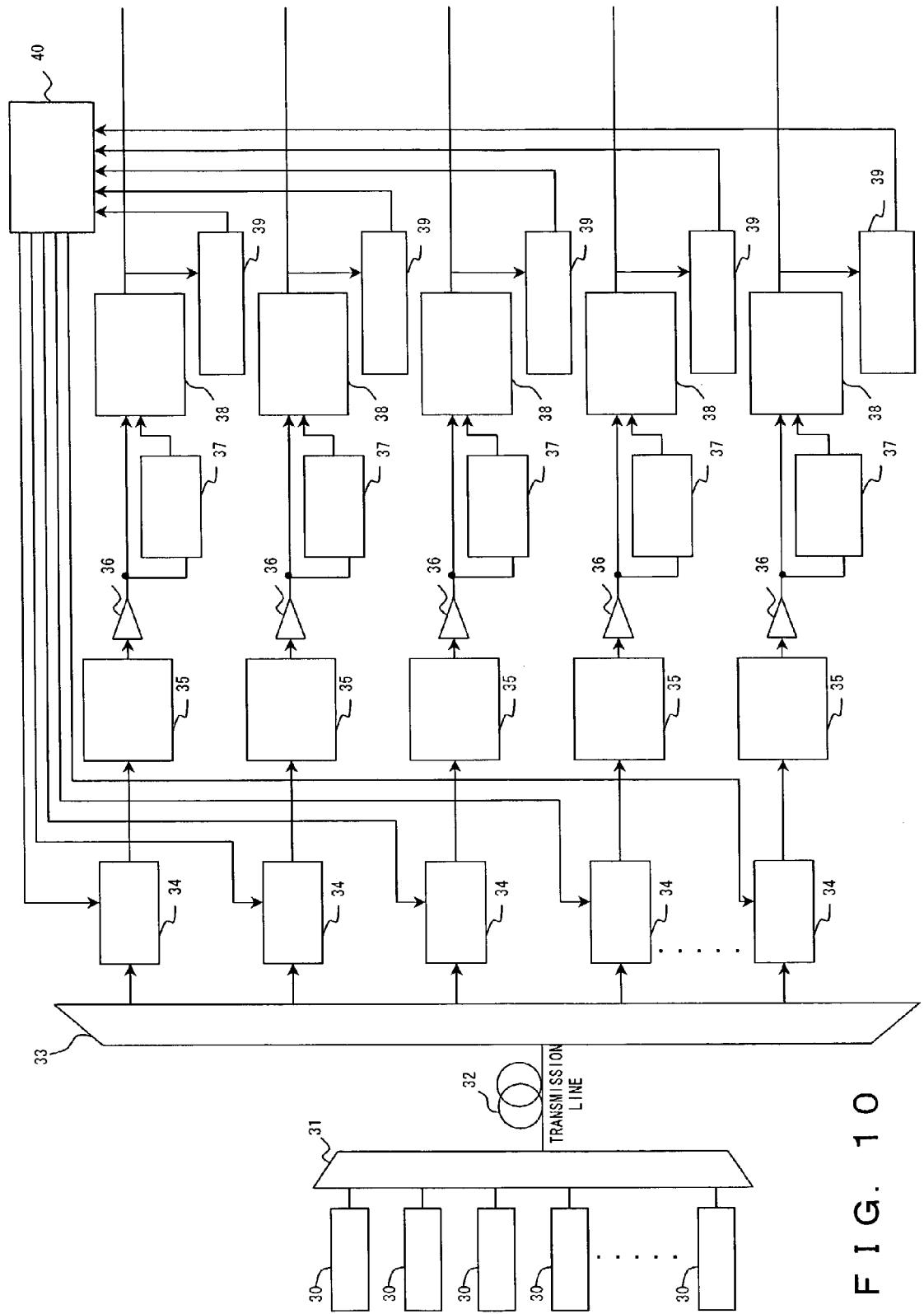
FIG. 10 shows an example configuration of an optical communication system in the first preferred embodiment (No. 3)

FIG. 10 shows an example configuration of the optical communication system in the first preferred embodiment (No. 3). In FIG. 10, one control circuit 40 controls all dispersion compensators provided for each channel using all the outputs of the transmission quality monitors provided for each channel in a receiver, unlike the other configurations.

Figure 11:
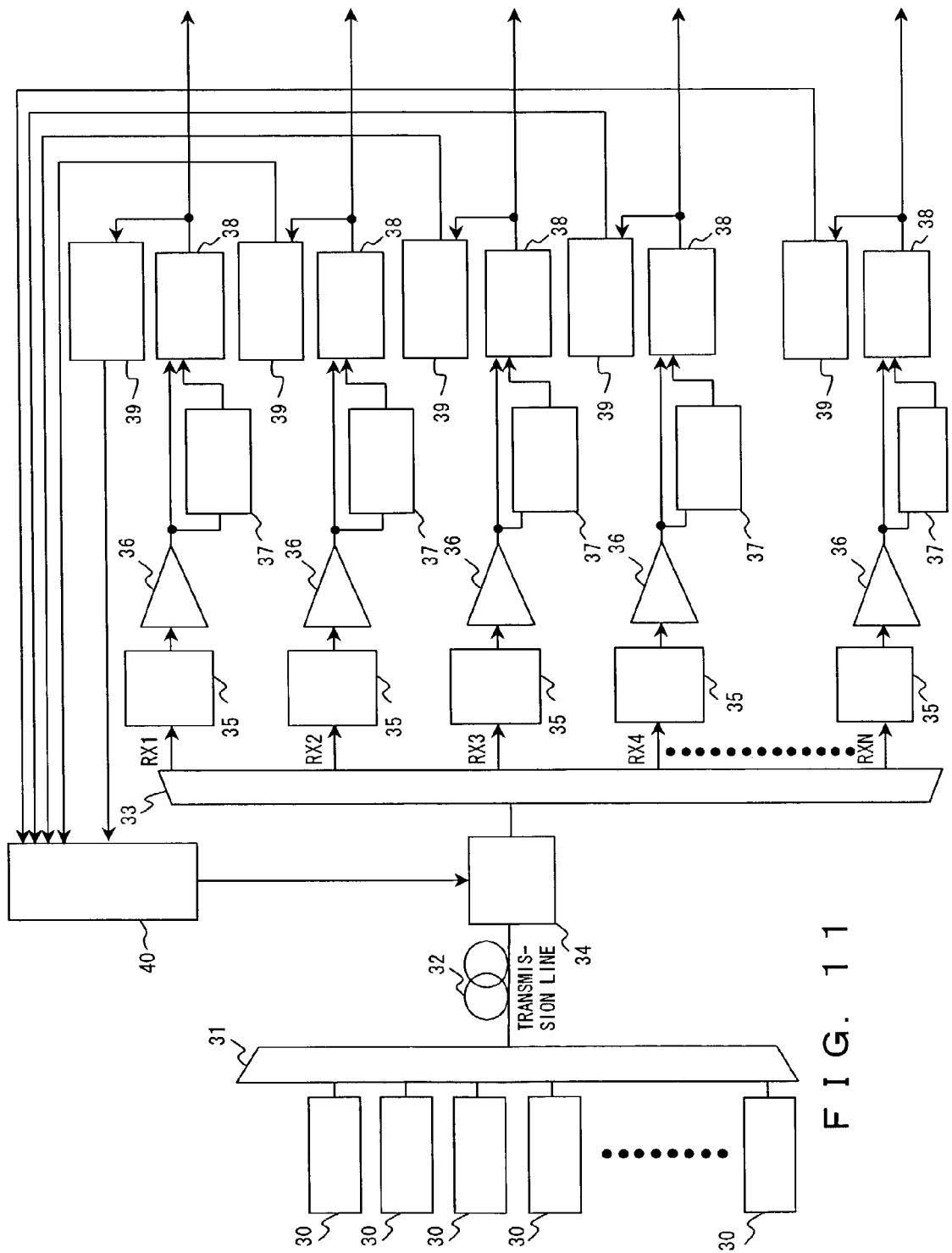
FIG. 11 shows an example configuration of an optical communication system in the first preferred embodiment (No. 4)

FIG. 11 shows an example configuration of the optical communication system in the first preferred embodiment (No. 4). In FIG. 11, one control circuit 40 controls one dispersion compensator commonly provided for each channel using all the monitoring results of transmission quality monitors provided for each channel in a receiver, unlike the other configurations.

Figure 12:
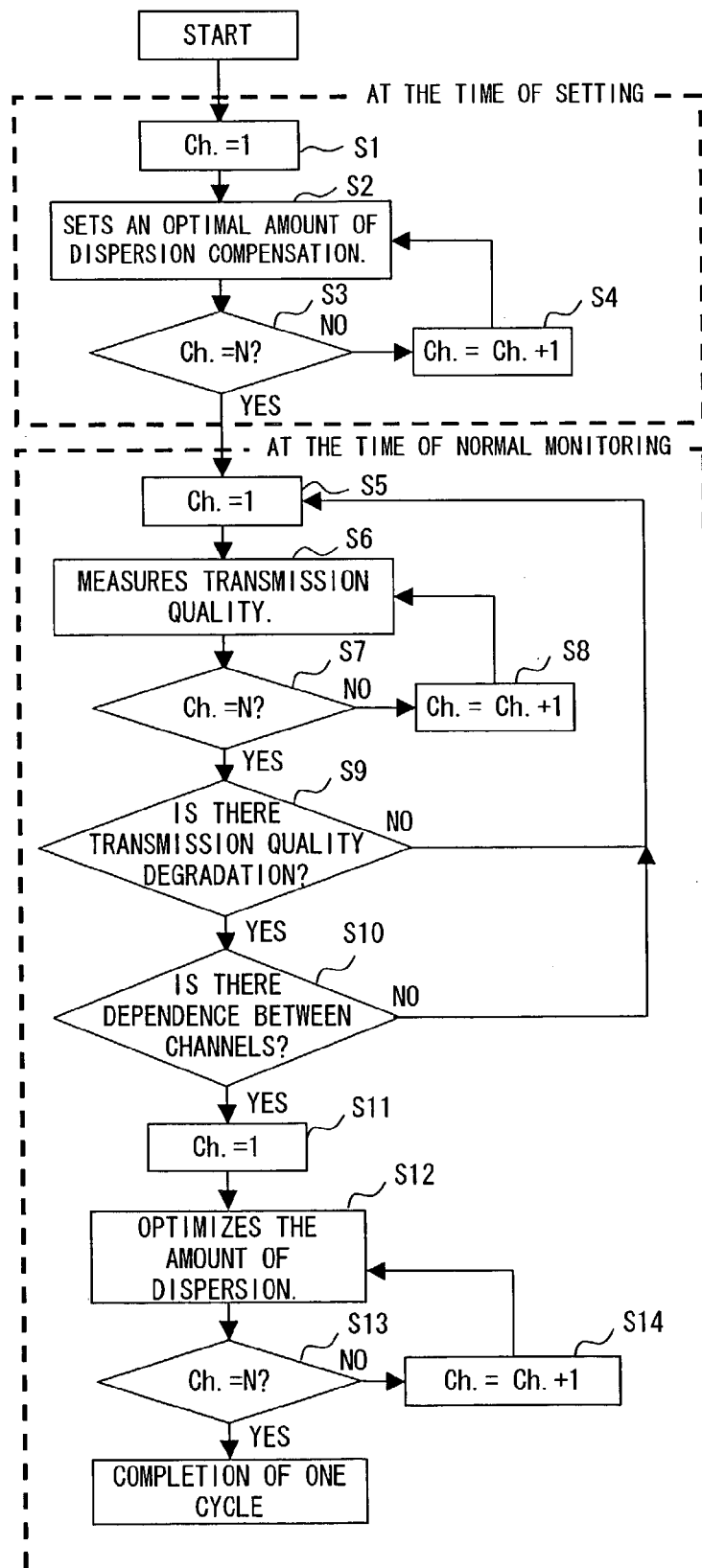
FIG. 12 is a flowchart showing the dispersion compensation control process in the configuration shown in FIG. 10.

FIG. 12 is a flowchart showing the dispersion compensation control process in the configuration shown in FIG. 10. In FIG. 12, firstly, in step S1, a channel number is set to 1, and in step S2, a process for setting an optimal dispersion compensation is applied to it. This process has been already described with reference to FIG. 5.

Generally, the amount of chromatic dispersion in a transmission line varies depending on the characteristic and length of a fiber, the used wavelength and the like. Furthermore, an optical land communication system does not have uniform span configuration. In particular, in an ultra-high-speed optical communication system with a small wavelength tolerance, the amount of chromatic dispersion compensation must be optimized for each chromatic dispersion compensator. Step S2 indicates such a process of each chromatic dispersion compensator.

As described earlier, for the optimal amount of chromatic dispersion compensation, the amount of chromatic dispersion of a fiber specified in its manual can be used. Alternatively, testing and changing the amount of compensation can also determine it.

Then, in step S3 it is judged whether the channel number is N, that is, if it is the last channel. If it is not the last channel, then by step S4 the channel number is incremented and the processes in and after step 2 are repeated. Then, when it reaches N, the flow proceeds to the process in step S5. These processes in steps S1 through S4 are, for example, performed at the time of the initial setting of the system.

Processes in and after step 5 are performed at the time of normal monitoring. Firstly, in step S5, a channel number is set to 1, and in step S6, the transmission quality of the channel is measured. Then, in step S7, it is judged whether the channel number is the last N. If it is not N, then by step S8, the channel number is incremented and the processes in steps S6 and S7 are repeated.

If in step S7, it is judged that the transmission quality measurements of all the channels are completed, then by step S9 it is judged whether there is transmission quality degradation in any of the channels. If there is no degradation, the processes in and after step S5 are repeated. If there is degradation even in one channel, then by step S10 it is further judged whether there is dependence between channels.

This dependence between channels is the amount of transmission quality degradation and means, for example, that the numbers of errors for each channel is almost the same. The amount of chromatic dispersion in a transmission line changes, for example, as temperature changes, which is described later. However, the amount of change due to temperature has no relation to its wavelength, and generally the distribution of dispersion change is the same throughout all of the channels. Therefore, transmission quality degradation has dependence on the amount of distribution of dispersion change between channels (there is almost the same degradation in all the channels).

If in step S10 it is judged that there is no such dependence between channels, it is judged that the transmission quality degradation is not due to chromatic dispersion in a transmission line, and the processes in and after step S5 are repeated without compensating for the degradation, which is the subject matter of the present invention.

If in step S10 it is judged that there is such dependence between channels, the degradation is compensated for. Firstly, in step S11, the channel number is set to 1, and in step S12, the amount of dispersion is optimized, that is, the degradation is compensated for. Then, in step S13, it is judged whether the channel number is the last N. If it is not N, then by step S14, the channel number is incremented, and the processes in steps S12 and S13 are repeated. If in step S13 it is N, one cycle of the process terminates.

As described with reference to step S10 of FIG. 12, if there is dependence between channels leading to a degradation tendency in the present invention, in other words, if transmission quality changes in all the channels with the same tendency, chromatic dispersion is compensated for. The reasons are further described below with reference to FIGS. 13 through 15.

Figure 13:
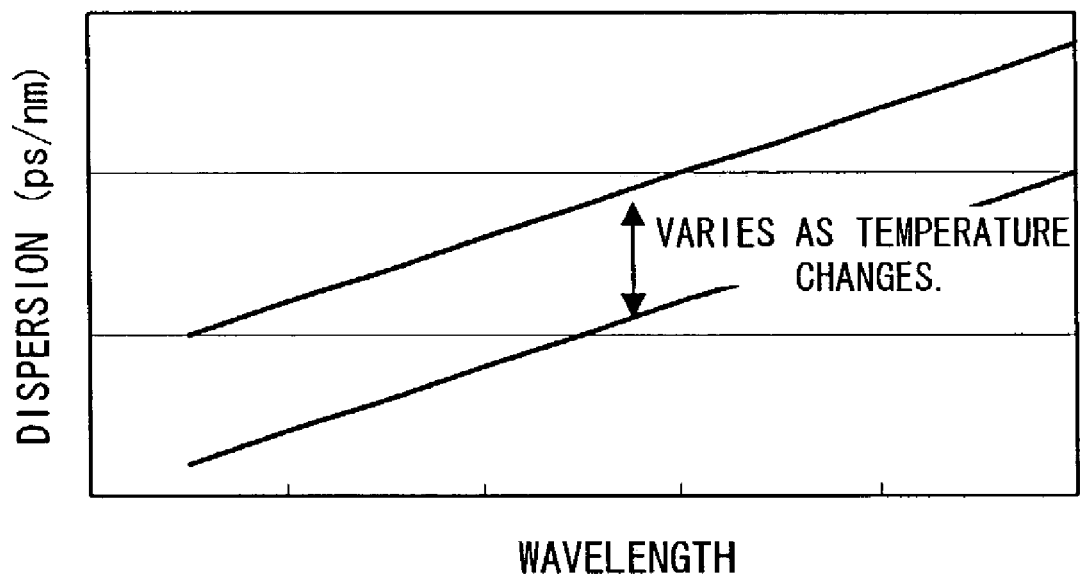
FIG. 13 shows the change with temperature of transmission line dispersion.

The major role that an automatic chromatic dispersion compensator should play during the operation of an optical communication system is to compensate for chromatic dispersion change due to the temperature change of an optical fiber as a transmission line. FIG. 13 shows the change of transmission line dispersion due to this temperature change. As shown in FIG. 13, the amount of chromatic dispersion almost uniformly changes across the entire wavelength range as temperature changes. For this reason, transmission quality degradation due to the change in the amount of wavelength dispersion in a transmission line does not occur individually in each channel and occurs in all channels with the same tendency.

Figure 15:
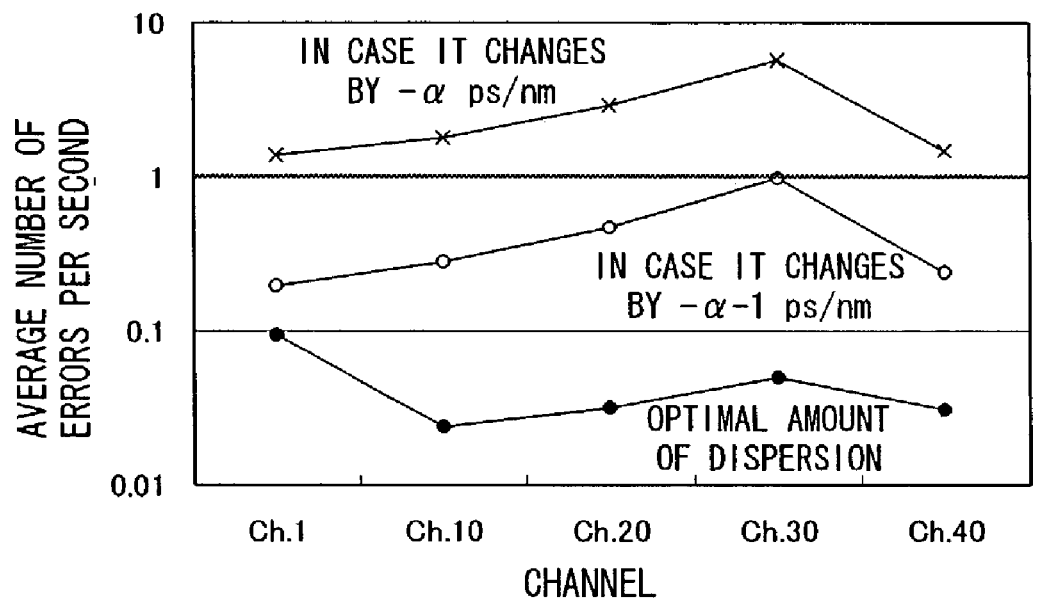
FIG. 15 shows the change of the number of errors caused when the chromatic dispersion decreases.

FIGS. 14 and 15 show the simulation results on the change of the average number of errors per second that is caused by the change of transmission line dispersion. Firstly, at the time of the initial setting of the system operation, the remaining amount of dispersion of each channel is set in such a way that transmission quality becomes the best. This setting amount is the optimal amount of dispersion.

FIG. 14 shows the change of the average number of errors caused when the residual amount of dispersion increases by $\alpha$ due to factors, such as temperature change and the like, and it is found that the transmission quality of all channels simultaneously degrade. In this case, if the residual amount of dispersion is improved by 1, specifically, is brought close to the optimal value, the respective transmission qualities of all channels are all simultaneously improved.

FIG. 15 shows the case where the residual amount of dispersion increases by $\alpha$ and the number of errors in a state where the residual amount of dispersion is improved by 1. In this case, it is found that there is the same tendency as in FIG. 14.

In this case, however, transmission quality degradation, due to factors other than the change of the amount of chromatic dispersion, such as the change of the identification threshold and identification phase of a receiver, the wavelength change of a transmitting light source, or the degradation and failure of components and materials, occurs individually in each channel of a chromatic dispersion compensator at control time intervals, such as in units of minutes. Therefore, the factors of transmission quality degradation can be separated.

In this way, the respective transmission quality of a plurality of channels can be monitored and a chromatic dispersion compensator can be provided for each channel, regardless of the existence/non-existence of the dependence between channels of a transmission quality change characteristic. In this case, too, by making the chromatic dispersion compensators jointly operate, transmission quality degradation due to factors other than chromatic dispersion can also be handled, and the problem, such as no control, can also be prevented from occurring.

However, if transmission quality is monitored using a general-purpose transmission quality monitor instead of a special chromatic dispersion monitor, it cannot be distinguished whether transmission quality degradation is due to an increase or decrease of chromatic dispersion in a transmission line. For this reason, in this case, there is further degradation possible due to over-compensation. In the second preferred embodiment of the present invention, such a possibility is avoided.

Figure 16:
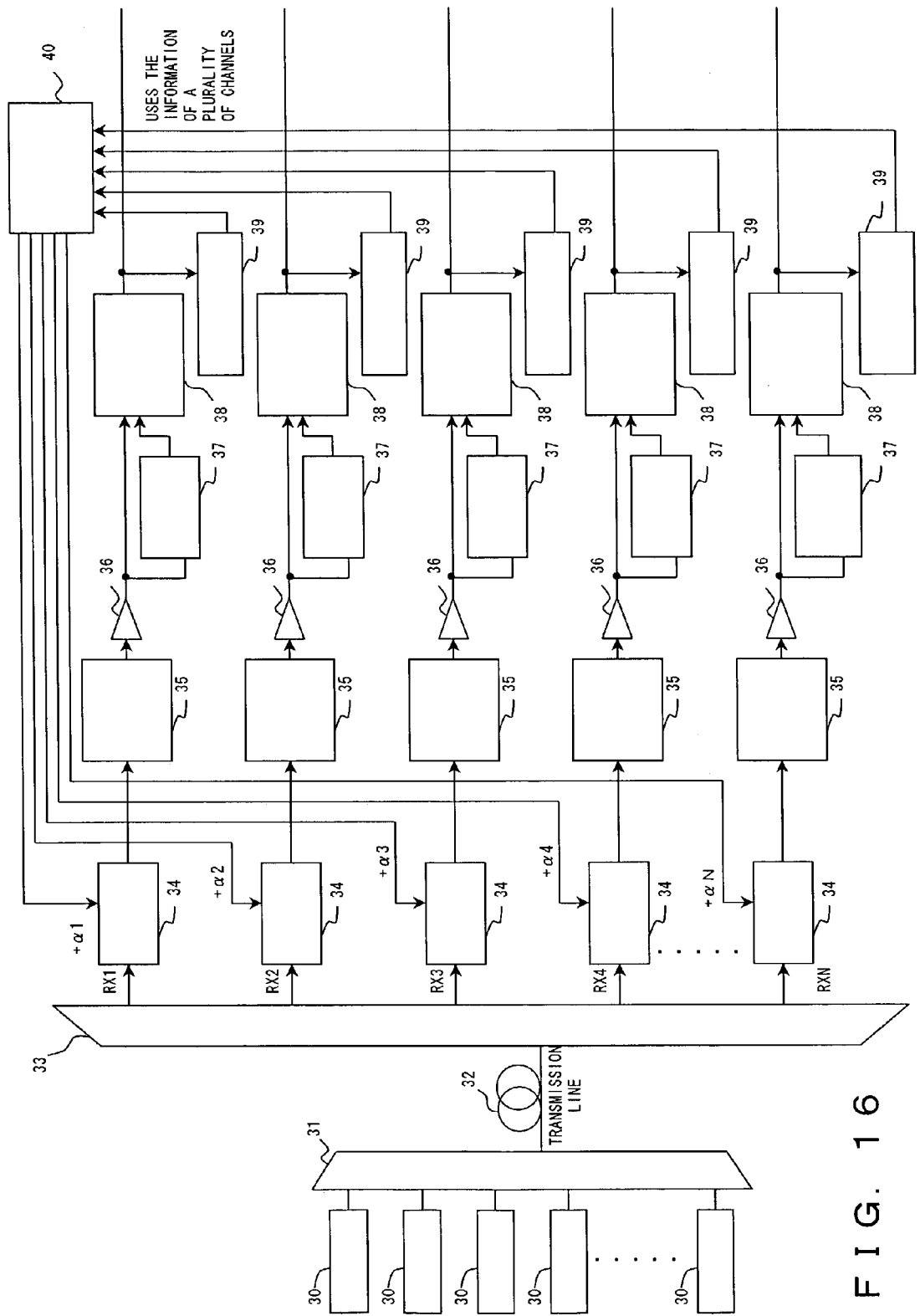
FIG. 16 shows an example configuration of an optical communication system in the second preferred embodiment (No. 1)

FIG. 16 shows an example configuration of an optical communication system in the second preferred embodiment (No. 1). The configuration shown in FIG. 16 is similar to that of the first preferred embodiment (No. 3) shown in FIG. 10. However, in FIG. 16, for example, one, corresponding to channel 1 of the chromatic dispersion compensators 34 for each channel, compensates for dispersion by adding $\alpha_1$ to the optimal amount from the control circuit 40 that is obtained in step S12 of FIG. 12. A chromatic dispersion compensator corresponding to channel 2 compensates for dispersion by adding $\alpha_2$ to the optimal amount. Similarly, each dispersion compensator for each channel generally compensates for dispersion by adding a different amount to the optimal value.

This amount $\alpha_n$ of chromatic dispersion is used, when dispersion is compensated for, and which is added to the optimal value can be determined, for example, by giving a different slope to the amount of dispersion depending on a channel number or changing it in the form of a step.

Figure 17:
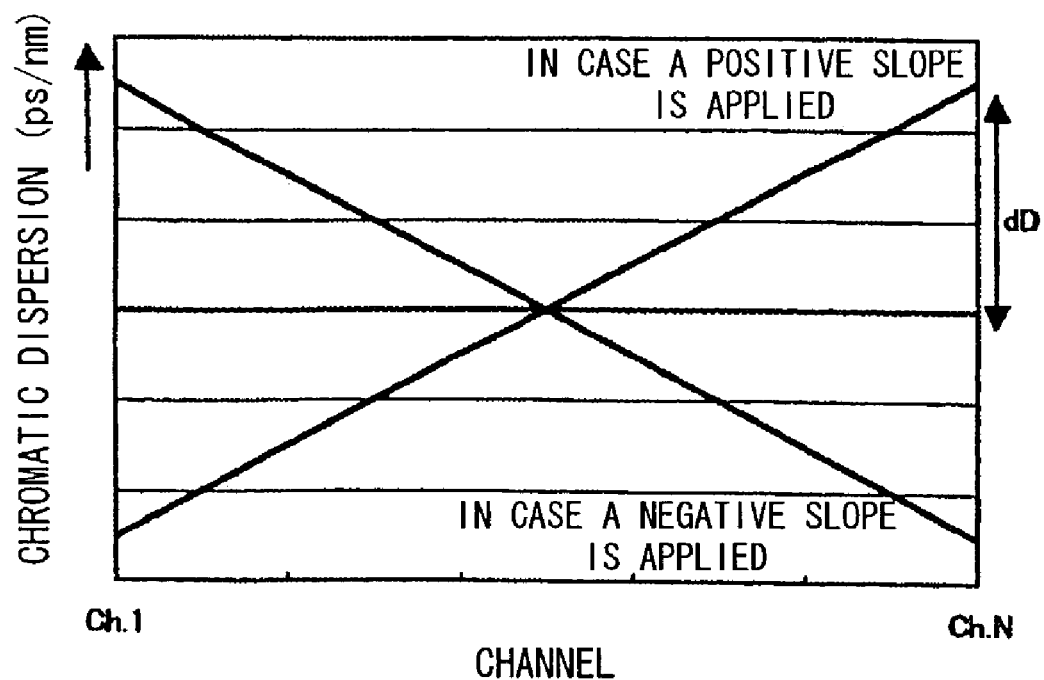
FIG. 17 shows the residual amount of dispersion with slope against a channel number.

FIG. 17 shows the case where the additional amount is determined by giving either positive or negative slope to the amount of dispersion in accordance with the increase of a channel number. If either positive or negative slope is given in this way, for example, the maximum amount of the residual dispersion must have minimal influence on transmission quality and be suppressed to the number of errors allowable by the chromatic dispersion compensator, in other words, must be suppressed within the range of the allowable penalty.

In this case, in order to determine the influence on transmission quality, the residual amount of dispersion must be compared with the amount of chromatic dispersion tolerance. For example, if a 40 Gbit/s NRZ signal is used, the chromatic dispersion tolerance is 60 to 100 ps/nm. In this case, the amount of dD shown in FIG. 17 must be reduced compared with this amount. Since the amount of chromatic dispersion tolerance varies depending on the characteristic of a receiver/transmitter and the amount of penalty allowable by the chromatic dispersion compensator, it must be checked for each system.

The minimum additional amount of chromatic dispersion is influenced by the sensitivity of a chromatic dispersion monitor or transmission quality monitor. For example, when a transmission quality monitor is sensitive enough to detect the influence of a 1 ps/nm chromatic dispersion change, it is sufficient if the amount of dD is 1 ps/nm or more. However, if the detection sensitivity of a transmission quality monitor is 100 ps/nm, the sensitivity is not negligible compared with the chromatic dispersion tolerance, and the system is broken. When a simulation was conducted using the error rate as the monitored result of a transmission quality monitor, the result was that it is practically possible for a transmission quality monitor to have a sensitivity of approximately 1 ps/nm.

Figure 18:
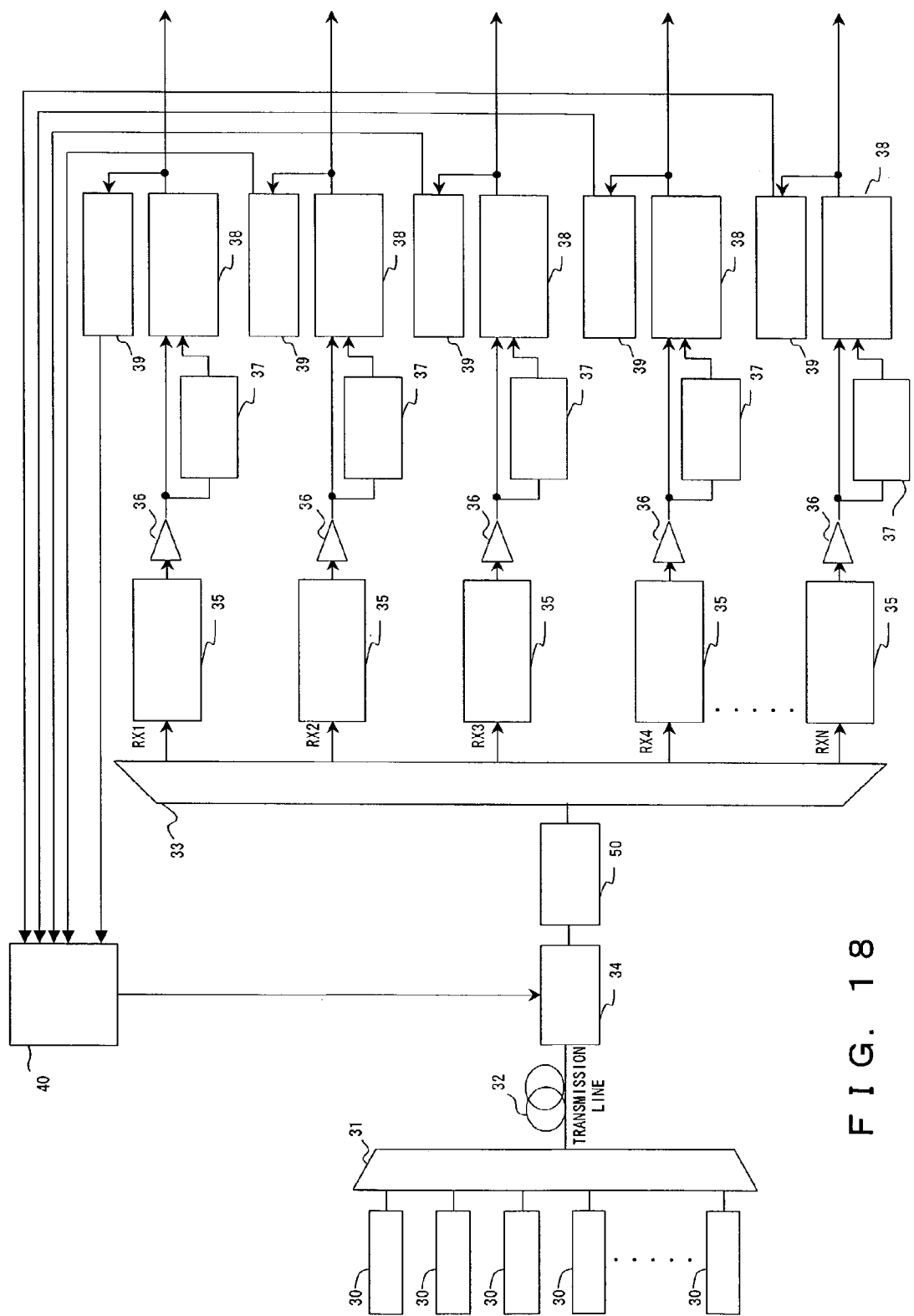
FIG. 18 shows an example configuration of an optical communication system in the second preferred embodiment (No. 2)

FIG. 18 shows an example configuration of an optical communication system in the second preferred embodiment (No. 2). In FIG. 16, a dispersion compensator for each channel compensates for dispersion by adding a different additional amount to the optimal amount for each channel. However, in FIG. 18, one dispersion compensator 34 simultaneously compensates for all channels. Here, a dispersion slope provider 50, which is designed to give a slope to the residual amount of dispersion for a channel, that is, a wavelength, gives a slope equivalent to an addition for each channel, to the result of the compensation, as shown in FIG. 17, and inputs the result to the demultiplexer 33. In this case, the order of the dispersion compensator 34 and dispersion slope provider 50 can also be reversed.

This dispersion slope compensation is described below with reference to FIG. 19. In FIG. 19, white points indicate the chromatic dispersion characteristic. A dispersion compensator compensates for chromatic dispersion in such a way as to obtain the amount of dispersion that does not depend on a channel indicated by diamonds, by providing the amount of chromatic dispersion compensation indicated by black points. In this case, a method for determining the value of a black point corresponding to a white point for each channel and providing the dispersion compensator with this value corresponds to the designation of an individual addition described with reference to FIG. 16. In the dispersion slope compensation, compensation is conducted for all channels by providing a specific channel with the value of each white point and that of its slope. Since the value of this slope does not depend on temperature and the like, the value of the slope can be set based on the value of a transmission line if the dispersion slope information of the transmission line is known in advance.

Figure 20:
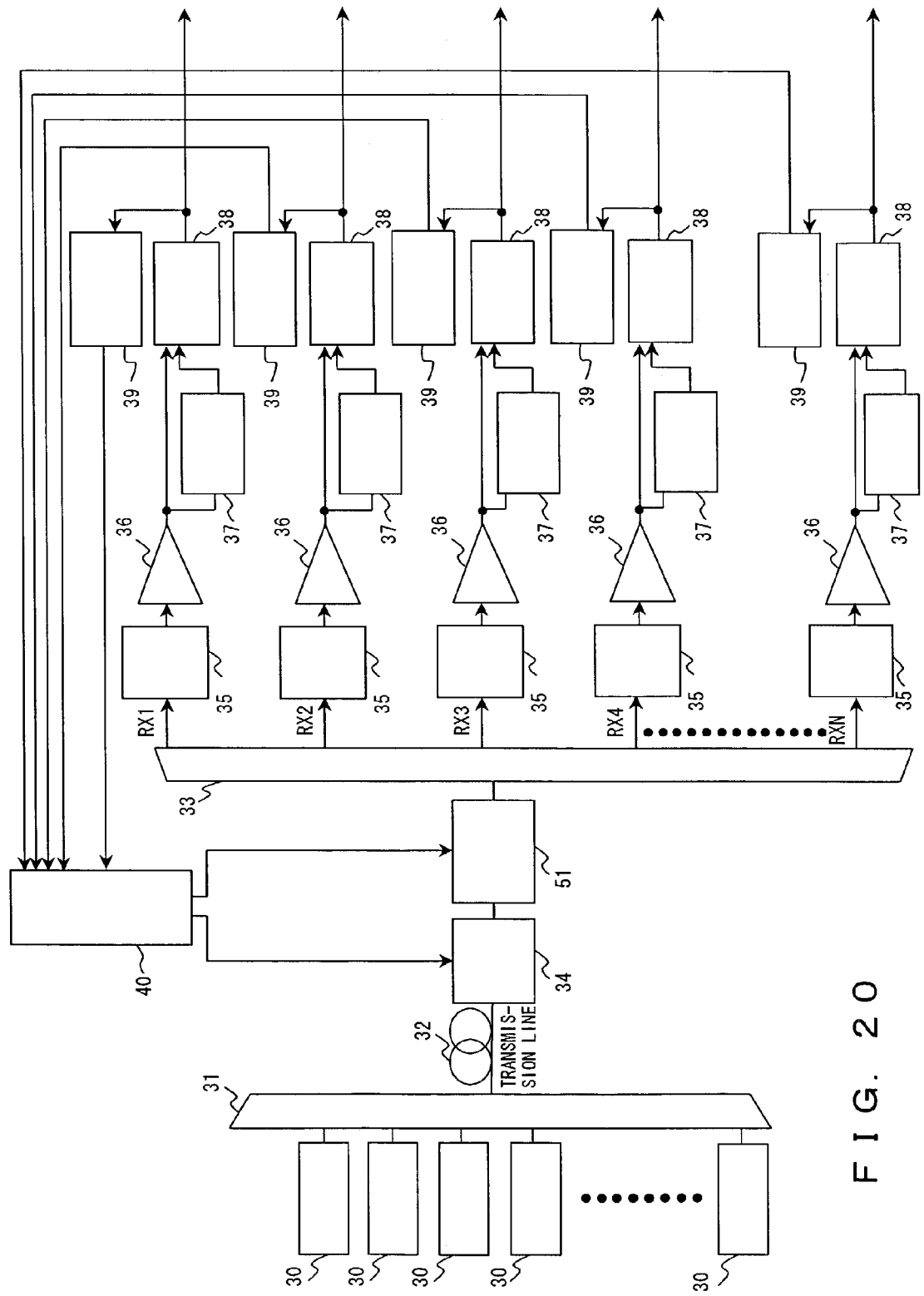
FIG. 20 shows an example configuration of an optical communication system in the second preferred embodiment (No. 3)

FIG. 20 shows an example configuration of the optical communication system in the second preferred embodiment (No. 3). Although in FIG. 18, the dispersion slope provider 50 gives dispersion with a specific slope to the result of compensation by the dispersion compensator 34, in FIG. 20, further changing the dispersion slope using a variable dispersion slope compensator 51 compensates for chromatic dispersion.

Figure 22:
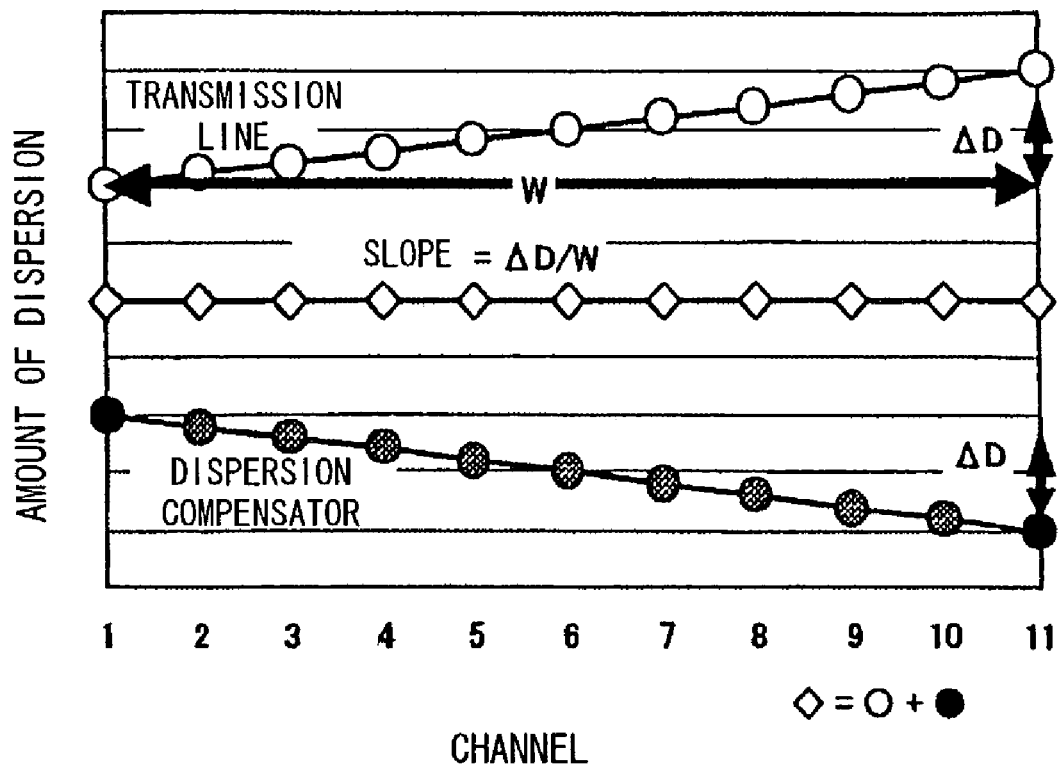
FIG. 22 shows the second dispersion slope optimization method.

FIGS. 21 and 22 show how to optimize such a dispersion slope when the dispersion slope changes in this way. FIG. 21 shows the first optimization method. In this case, firstly, at the time of initial setting of the system, the amount of chromatic dispersion compensation is optimized using a transmission quality monitor corresponding to one channel, and then, the dispersion slope is optimized using transmission quality monitors corresponding to one or more channels. In this example, the amount of chromatic dispersion compensation is optimized for channel 1, and then, the slope is optimized.

FIG. 22 shows the second optimization method. In FIG. 22, at the time of the initial setting of the system, the amounts of chromatic dispersion compensation of a plurality of channels are optimized. In this case, the dispersion slopes of channel 1 and 11 are optimized using W and ΔD shown in FIG. 22. Here, the amount of dispersion equivalent to $\alpha_n$ for each channel is given.

Figure 23:
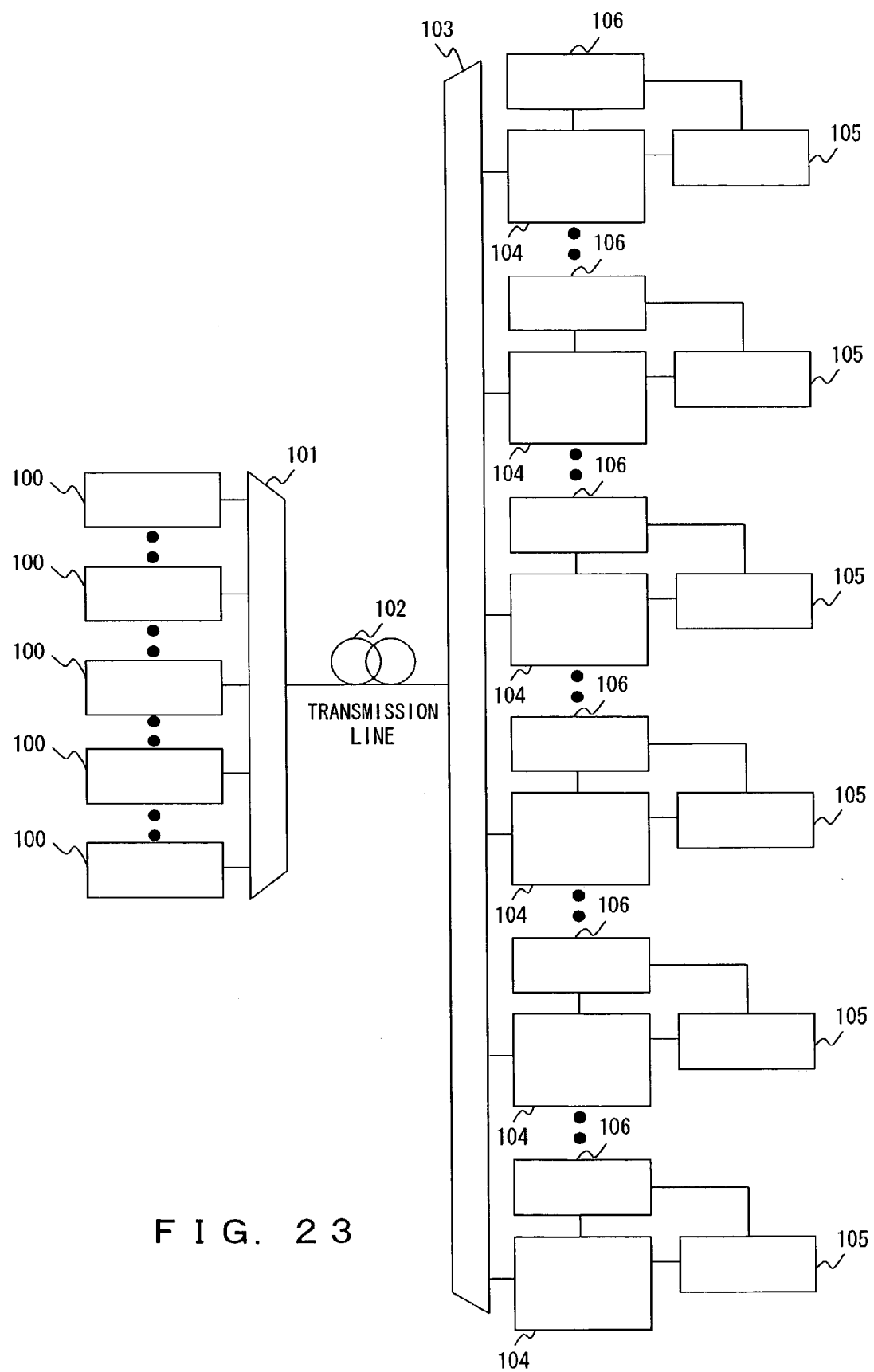
FIG. 23 shows an example configuration of an optical communication system used in a simulation where chromatic dispersion values have a slope.

Next, the simulation results on the judgment for an increase or decrease of chromatic dispersion in a transmission line in the second preferred embodiment are described with reference to FIGS. 23 through 25. FIG. 23 shows an example configuration of the optical communication system used in the simulation. Although this is basically the same as the optical communication system described with reference to FIG. 1, it differs from the system shown in FIG. 1 in that the additional amount of dispersion, with the slope shown in FIG. 24, is used for chromatic dispersion compensation for each channel.

Figure 25:
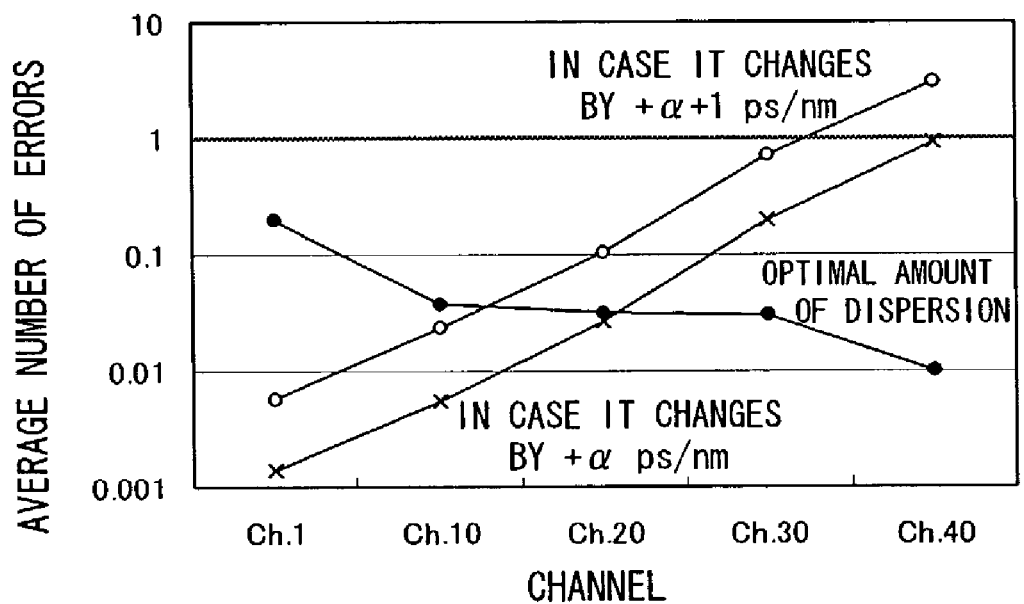
FIG. 25 shows the simulation result obtained when transmission line dispersion increases.
Figure 26:
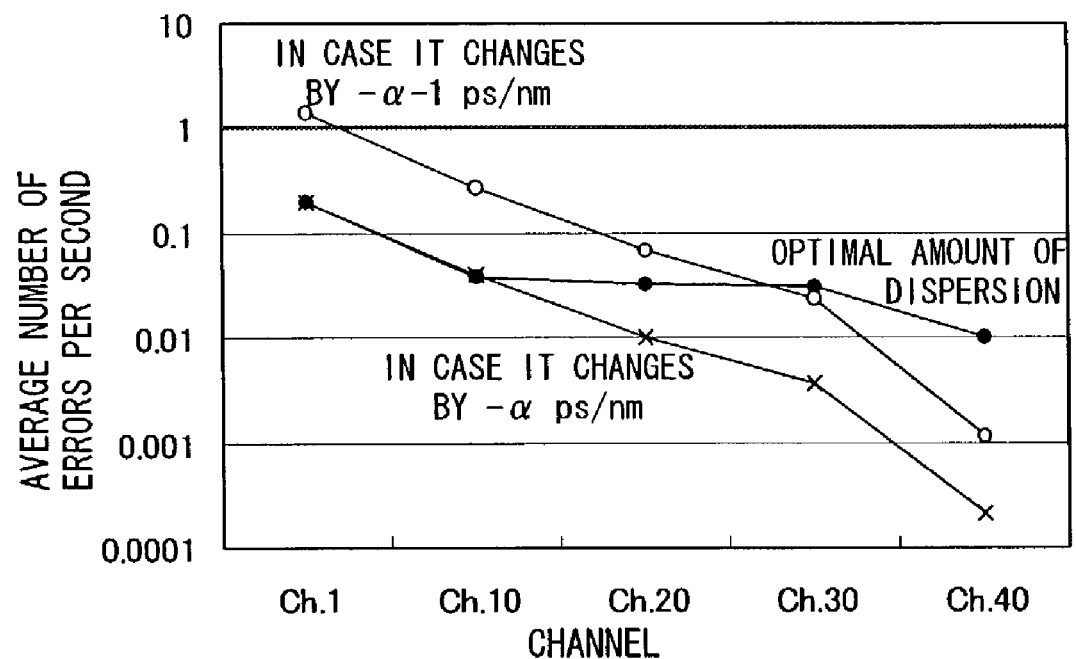
FIG. 26 shows the simulation result obtained when transmission line dispersion decreases.

FIGS. 25 and 26 show the results of the simulations. If the average number of errors, 1 per second, is used as the allowable number for transmission quality degradation, that is, the penalty, then in FIG. 25, the number of errors does not exceed the allowable number in any channel before the amount of the chromatic dispersion increase in a transmission line reaches α ps/nm. However, when it reaches α+1 ps/nm, the number of errors exceeds the allowable value due to the slope of the additional amount of the chromatic dispersion from the side of channel 40 to which an amount of +2 ps/nm is added.

FIG. 26 shows the case where the amount of chromatic dispersion in a transmission line decreases. Although the number of errors does not exceed the allowable value in any channel up to an amount of decrease of −α ps/nm, when it reaches −α−1 ps/nm, the number of errors exceeds the allowable value from the side of channel 1 to which the an amount of −2 ps/nm is added, in accordance with its slope. In differentiating a channel by adding a different amount to the residual amount of chromatic dispersion for each channel in this way, it can be judged whether the amount of chromatic dispersion in a transmission line increases or decreases.

Next, the case where chromatic dispersion is compensated for by differentiating the optimal amount of chromatic dispersion of each channel, specifically, adding a different amount to the optimal amount of chromatic dispersion for each channel and where such a different amount is set for part of the channels in a form of a slope or step, is described with reference to FIGS. 27 to 37.

Figure 27:
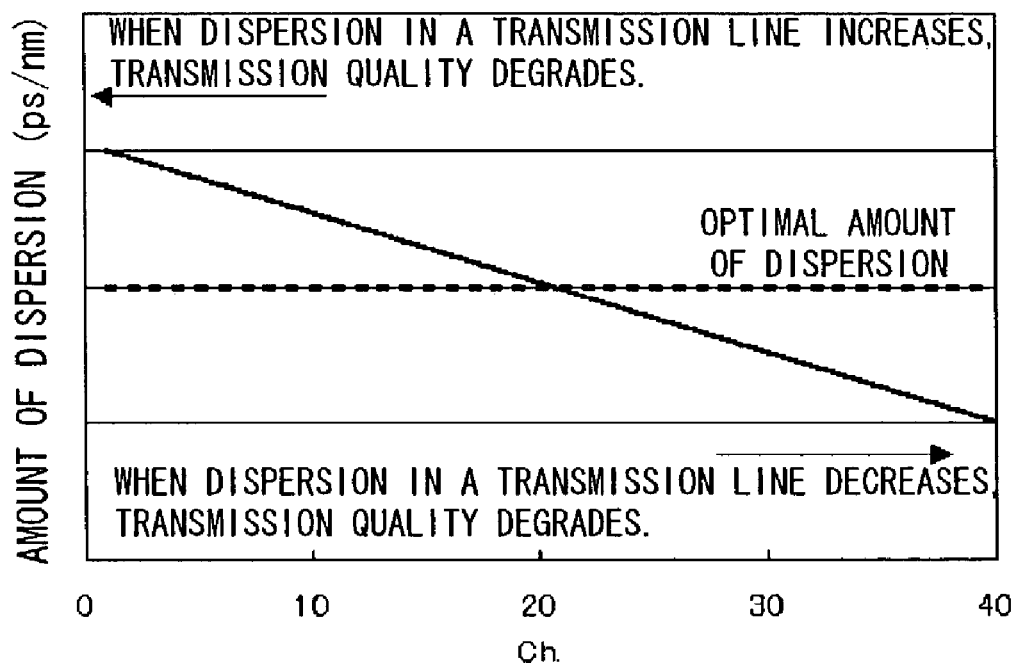
FIG. 27 shows a setting example of the slope for an amount of dispersion (No. 1)
Figure 28:
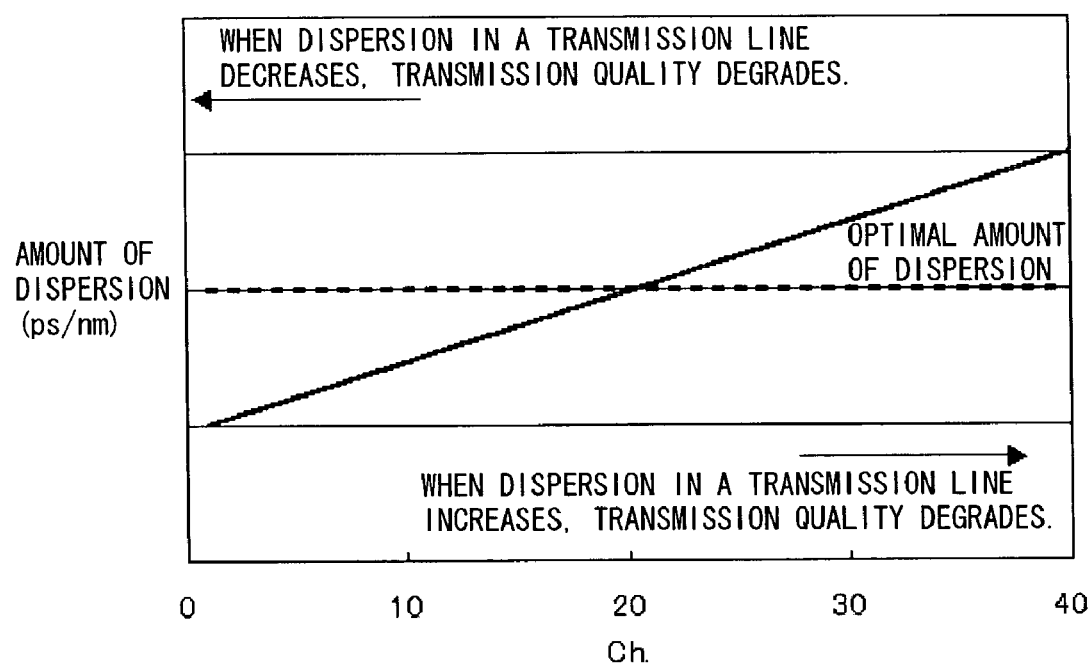
FIG. 28 shows a setting example of the slope for an amount of dispersion (No. 2)
Figure 29:
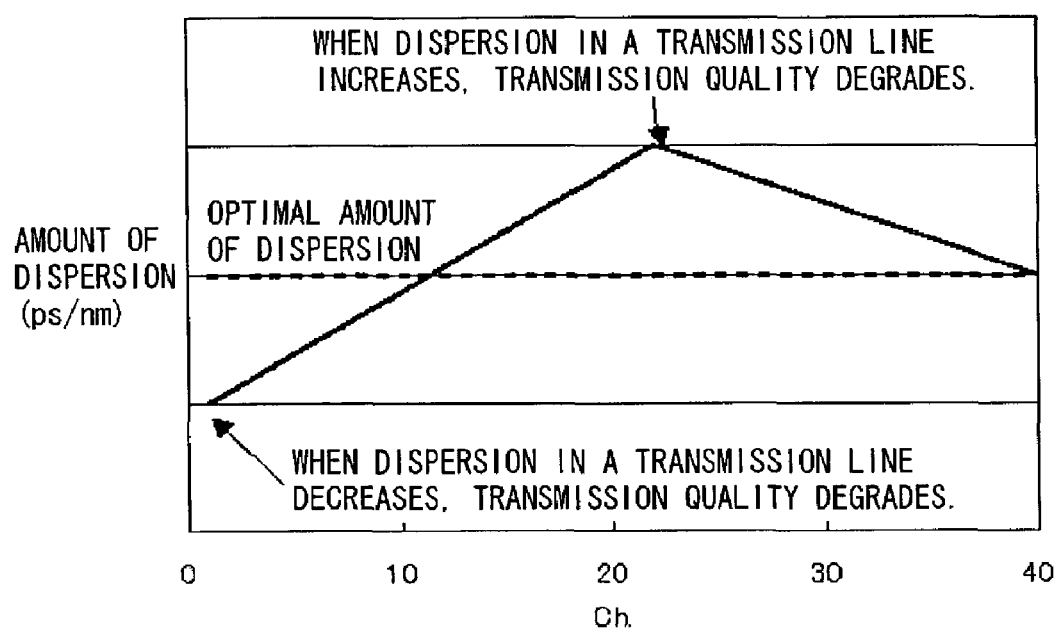
FIG. 29 shows a setting example of the slope for an amount of dispersion (No. 3)
Figure 30:
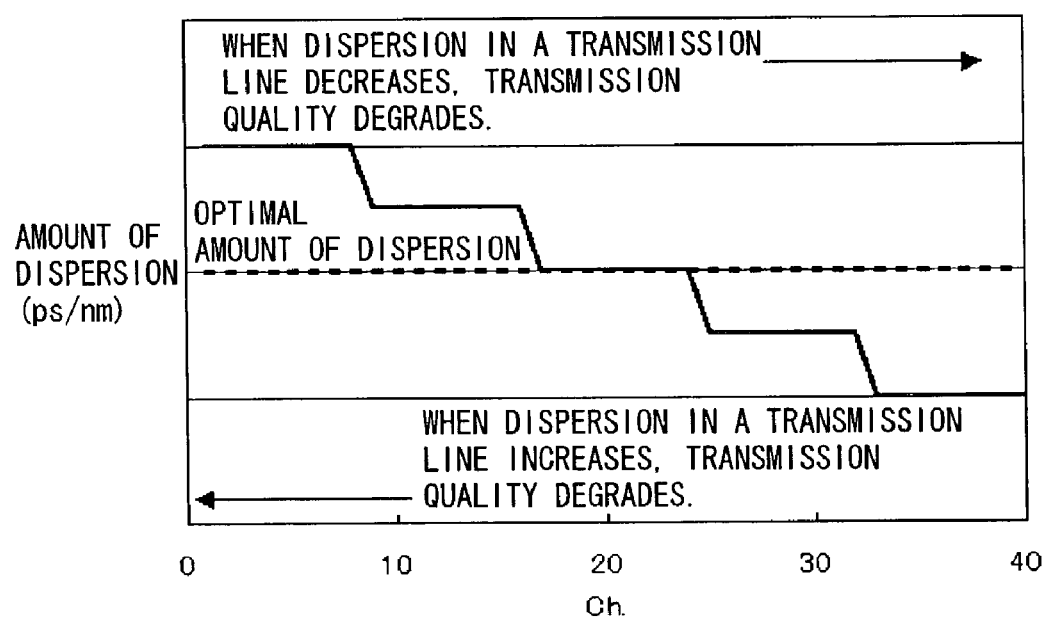
FIG. 30 shows an example of the step-like change for an amount of dispersion (No. 1)
Figure 31:
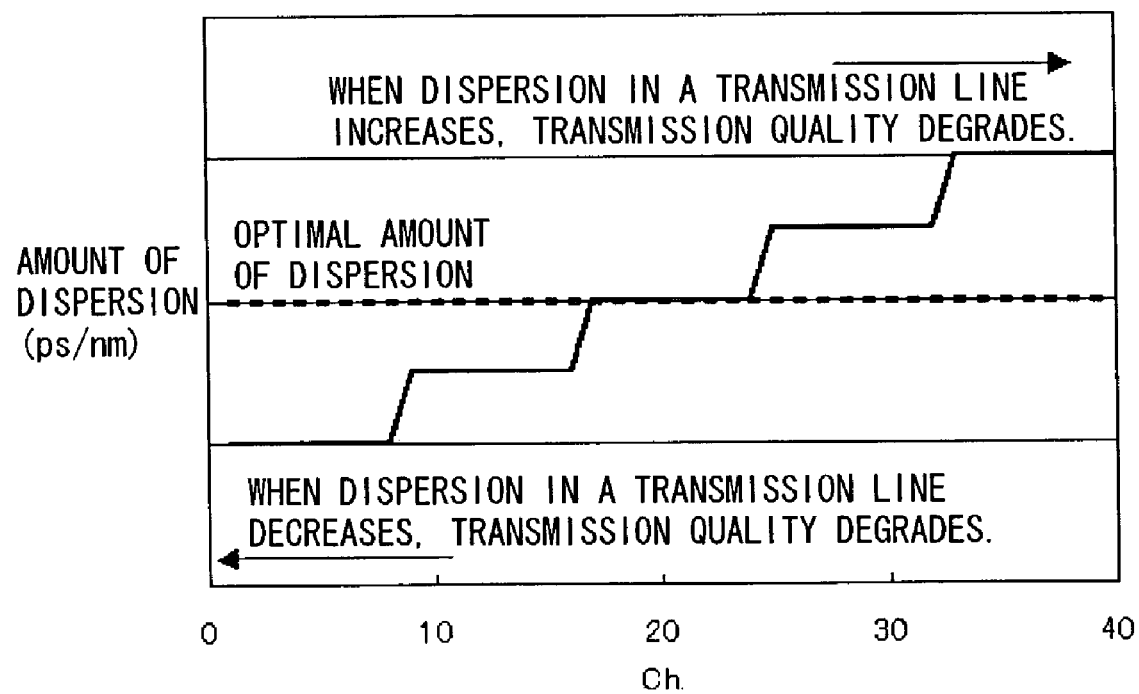
FIG. 31 shows an example of the step-like change for an amount of dispersion (No. 2)
Figure 32:
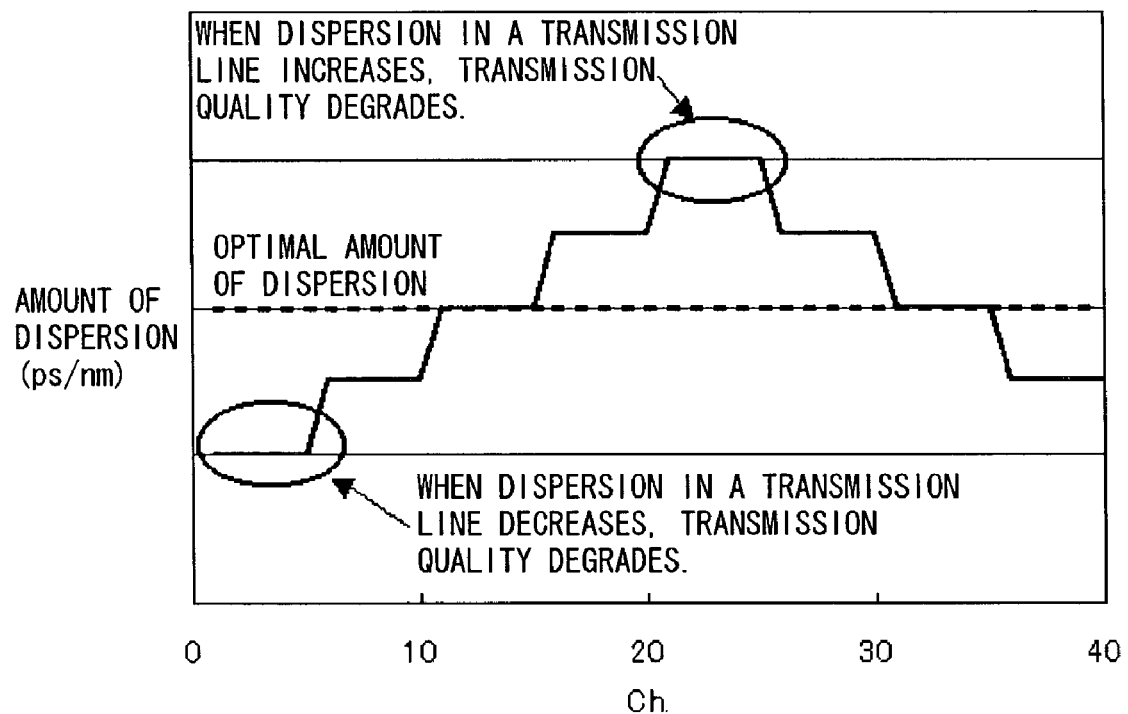
FIG. 32 shows an example of the step-like change for an amount of dispersion (No. 3)
Figure 33:
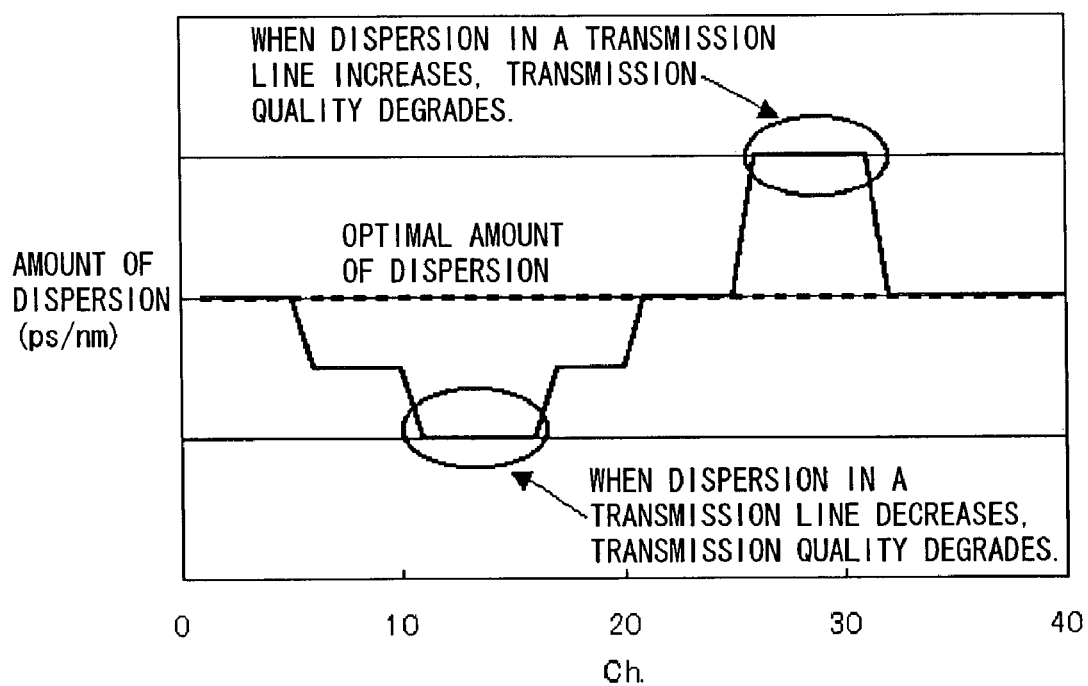
FIG. 33 shows an example of the step-like change for an amount of dispersion (No. 4)

FIGS. 27 through 29 show the case where the additional amount of chromatic dispersion is set for all of the channels in the form of a slope. In this case, if the amount of chromatic dispersion in a transmission line increases, then in FIG. 27, transmission quality degrades from the channel 1 side, and in FIG. 28, conversely, it degrades from the channel 40 side. In FIG. 29, the transmission quality of channel 20 located at the center degrades firstly.

FIGS. 30 through 33 show the case where the additional amount of chromatic dispersion is set for all of the channels in the form of a step. In FIGS. 30 through 33, the same additional amount of chromatic dispersion is set for a plurality of channels.

Figure 34:
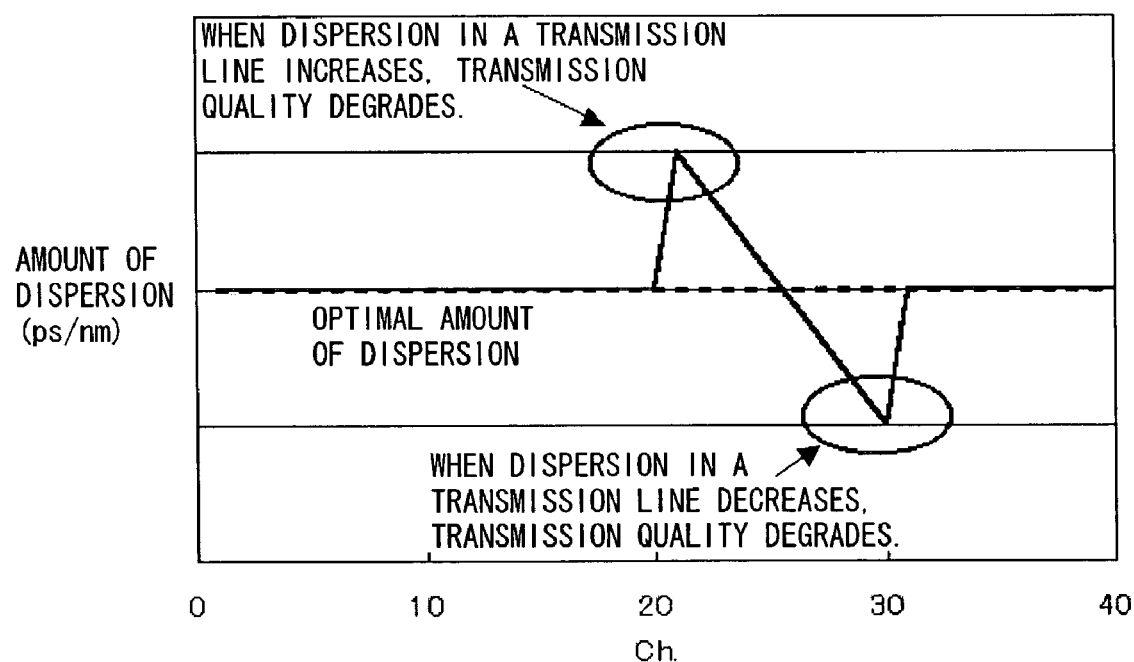
FIG. 34 shows an example of setting the slope for an amount of dispersion to part of the channels (No. 1)
Figure 35:
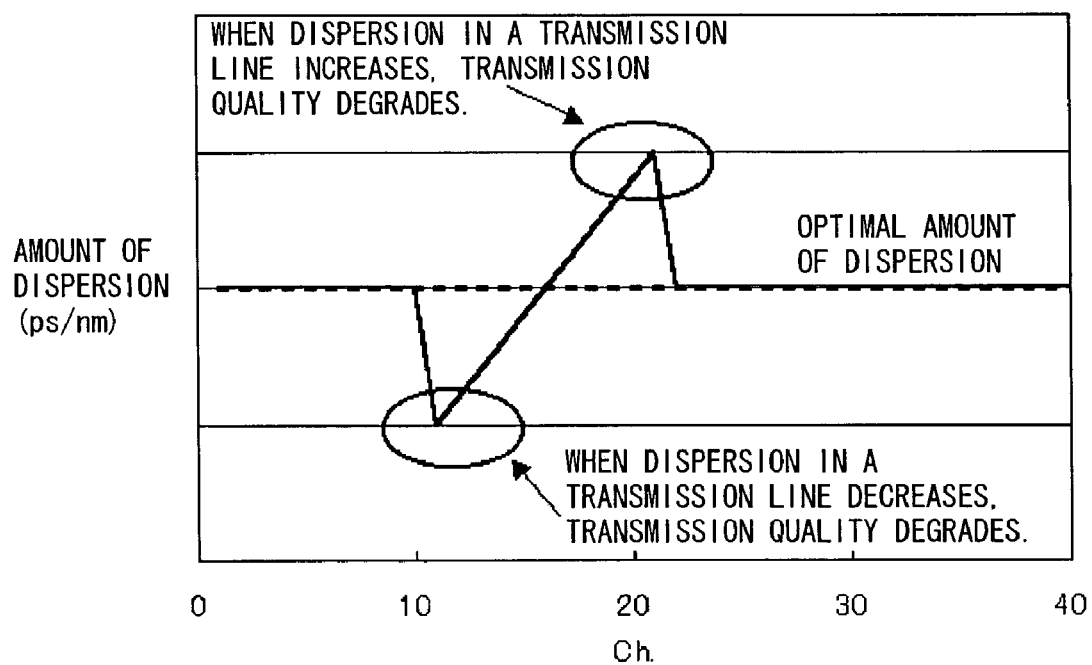
FIG. 35 shows an example of setting the slope for an amount of dispersion, to part of the channels (No. 2)

FIGS. 34 and 35 show the case where an additional amount of chromatic dispersion is set in part of the channels used in an optical communication system in the form of a slope. In FIGS. 34 and 35, if the amount of chromatic dispersion in a transmission line increases, firstly, transmission quality degrades in the neighborhood of channel 20 located at the center. If the chromatic dispersion in a transmission line decreases, firstly, transmission quality degrades in the neighborhood of channels 30 and 10 in FIGS. 34 and 35, respectively.

Figure 36:
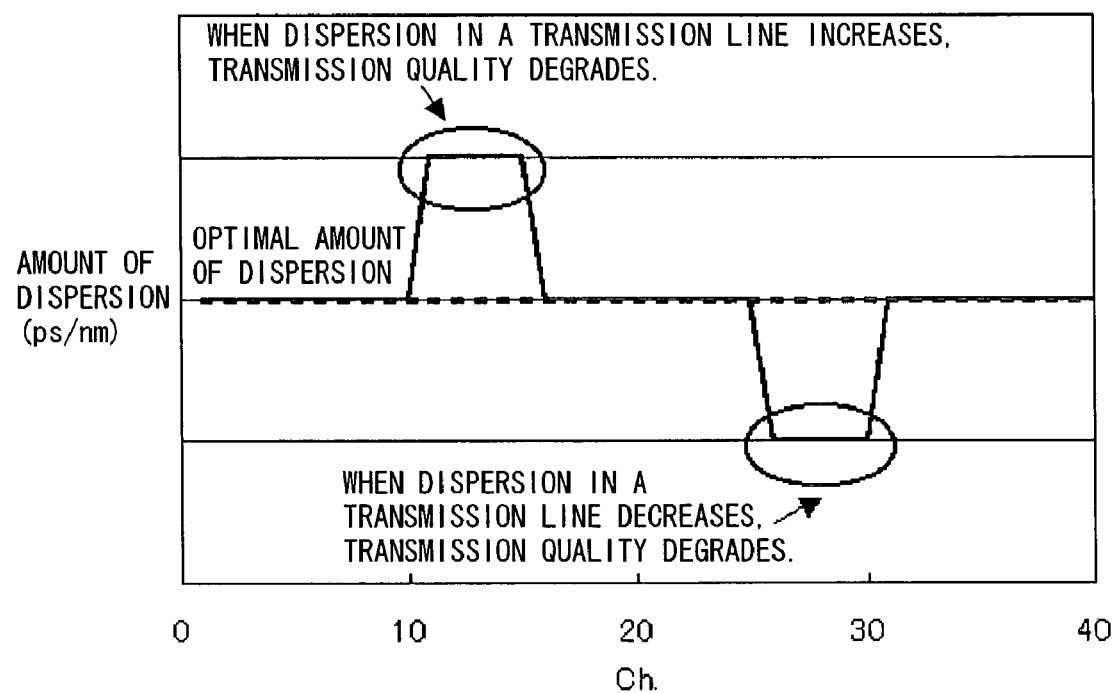
FIG. 36 shows an example of setting a step-like change for an amount of dispersion to part of the channels (No. 1)
Figure 37:
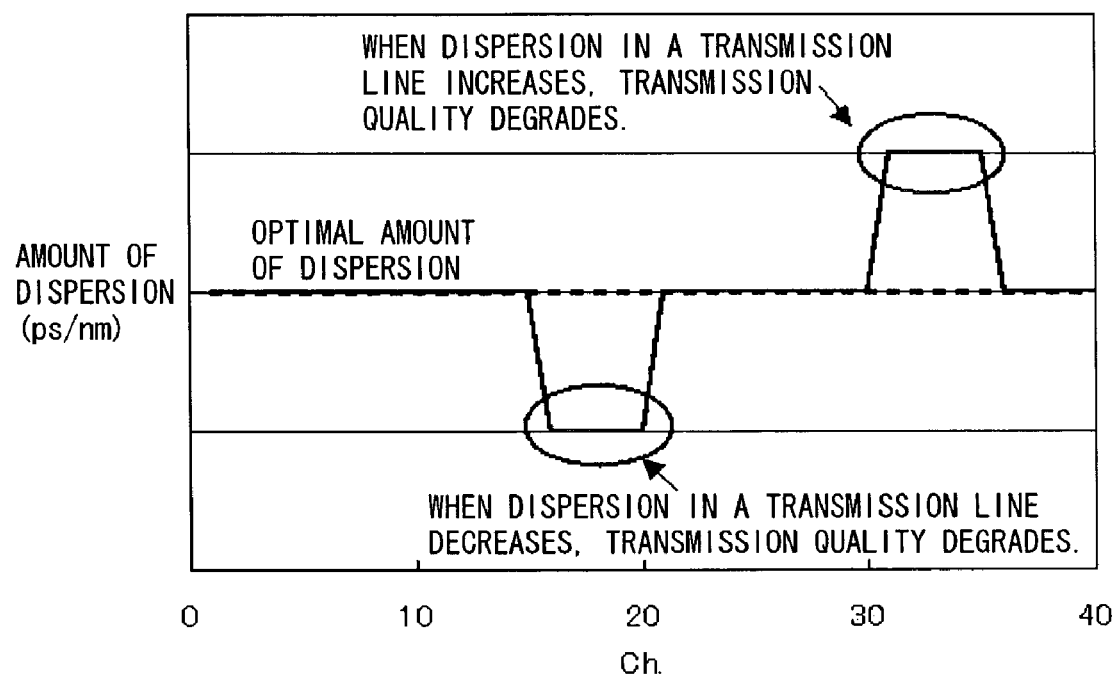
FIG. 37 shows an example of setting a step-like change for an amount of dispersion for part of the channels (No. 2)

FIGS. 36 and 37 show the case where an additional amount of chromatic dispersion is set in part of the channels used in an optical communication system in the form of a step. In each of FIGS. 36 and 37, whether the chromatic dispersion in a transmission line increases or decreases can be judged by the transmission quality of that channel which firstly degrades.

FIG. 38 is a flowchart showing the process of judging whether the amount of chromatic dispersion in a transmission line increases or decreases in the second preferred embodiment. In FIG. 38, firstly, in step S21, channel number n is set to 1, and in step S22, the transmission quality information for the channel is obtained. Then, in step S23, it is judged whether n is less than the maximum number of channel N. If it is less than N, then in step S24, n is incremented, and the processes in and after step S21 are repeated.

In step S32, if is not judged that n is less than N, in step S25 it is judged whose channel transmission quality changes. If there is no change, the processes in step 21 and after are repeated.

If there is a change in transmission quality, in step S26, it is judged whether the change occurs on the side of channel 1. If it occurs on the side of channel 1, then in step S27 it is judged that the amount of transmission dispersion in a transmission line has decreased. If it does not occur on the side of channel 1, then in step S28, it is judged whether the transmission quality change occurs on the side of channel N. If it occurs on the side of channel N, then by step S29 it is judged that the amount of transmission dispersion in a transmission line has increased. If it too does not occur on the side of channel N, the processes in and after step S21 are repeated. These judgment results correspond to those made when a positive slope is applied to the residual amount of dispersion in FIG. 17.

Next, the third preferred embodiment of the present invention is described. In the third preferred embodiment, the state of each components of the optical communication system is monitored. If there is a characteristic change factor for each component, such as the voltage change of a power supply and the like, it is judged that there is no dependence between channels in the transmission quality change, regardless of whether the result of a transmission quality monitor judges that transmission quality degrades. In this case, control is exercised in such a way that a dispersion compensator does not compensate for the chromatic dispersion.

Figure 39:
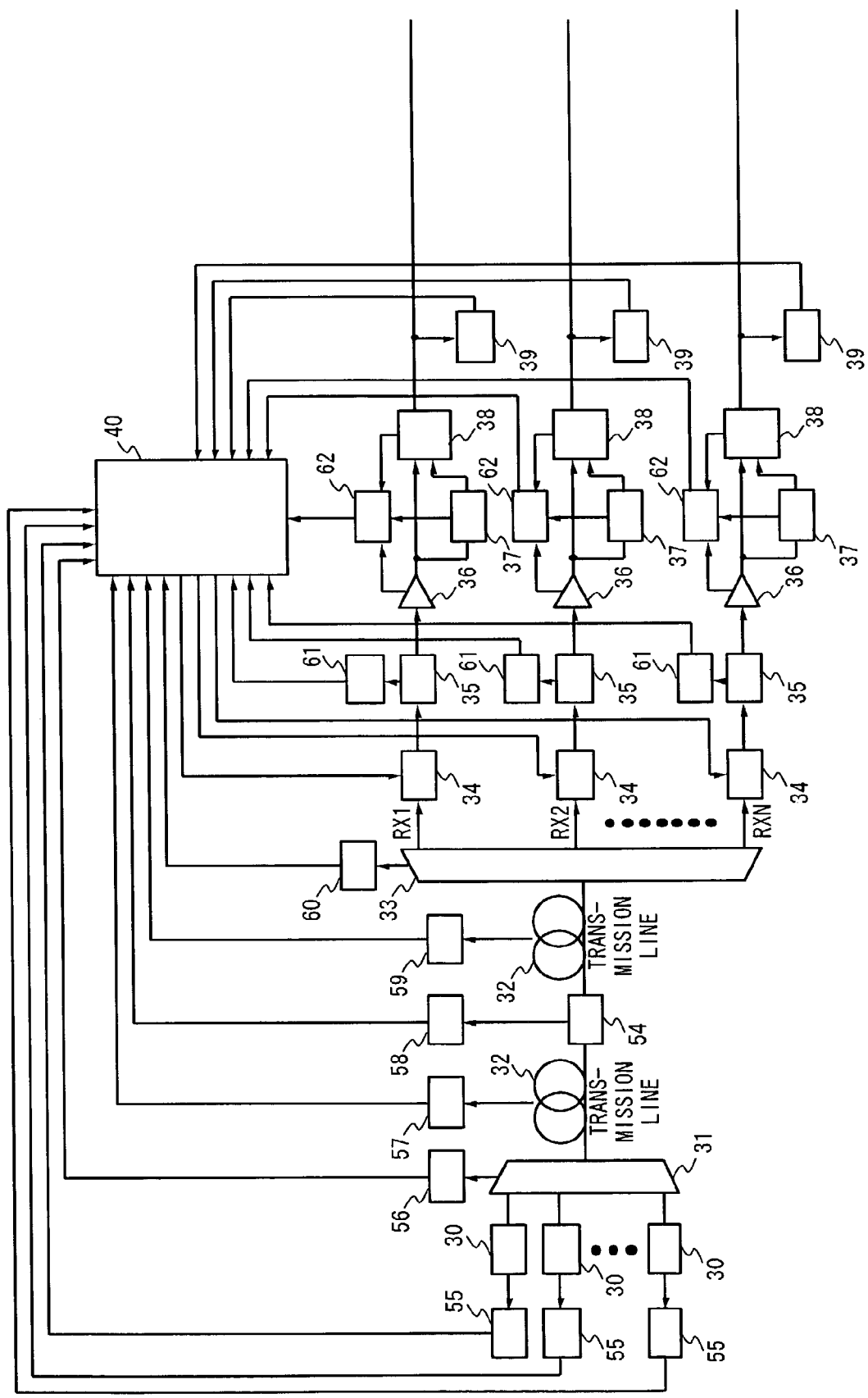
FIG. 39 shows an example configuration of an optical communication system in the third preferred embodiment (No. 1)

FIG. 39 shows an example configuration of the optical communication system in the third preferred embodiment (No. 1). This optical communication system comprises state monitors 55 monitoring the state of each transmitter 30, a state monitor 56 monitoring the multiplexer 31, state monitors 57 and 59 monitoring the transmission lines 32, a state monitor 58 monitoring the repeater 54, a state monitor 60 monitoring the demultiplexer 33, state monitors 61 monitoring the optical/electrical conversion units 35, amplifiers 36, clock extraction circuits 37, state monitors 62 monitoring decision circuits 38 and the like. The output of each state monitor is supplied to the control circuit 40 and each dispersion compensator 34 is controlled.

Figure 40:
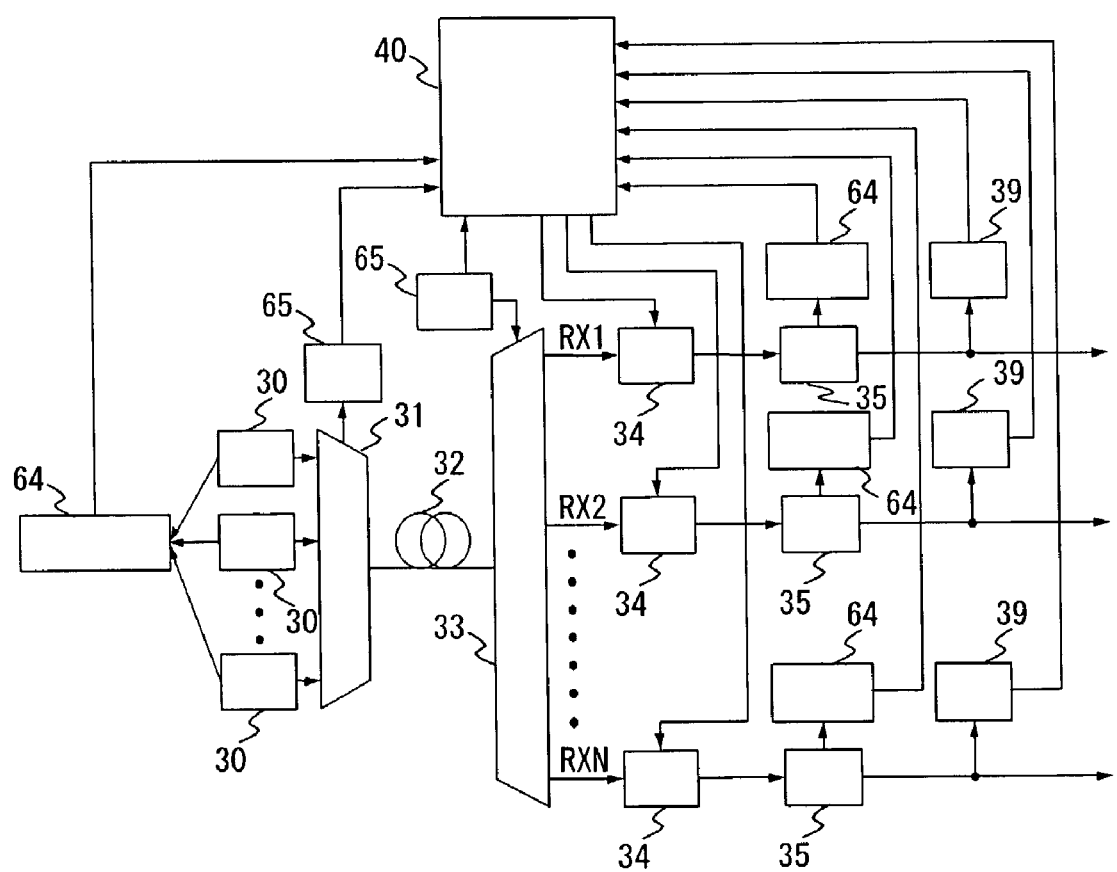
FIG. 40 shows an example configuration of an optical communication system in the third preferred embodiment (No. 2)

FIG. 40 shows an example configuration of the optical communication system in the third preferred embodiment (No. 2). Since in FIG. 40, temperature and power supply voltage have great influence on the characteristic of each component of the optical communication system, the optical communication system further comprises monitors monitoring temperature and power supply voltage, and monitors monitoring only temperature. Specifically, the optical communication system further comprises temperature/power supply voltage change monitors 64 monitoring the transmitters 30 and optical/electrical conversion units (O/E) 35 and temperature monitors 65 monitoring the multiplexer 31 and demultiplexer 33. The result of each monitor is supplied to the control circuit 40.

Figure 41:
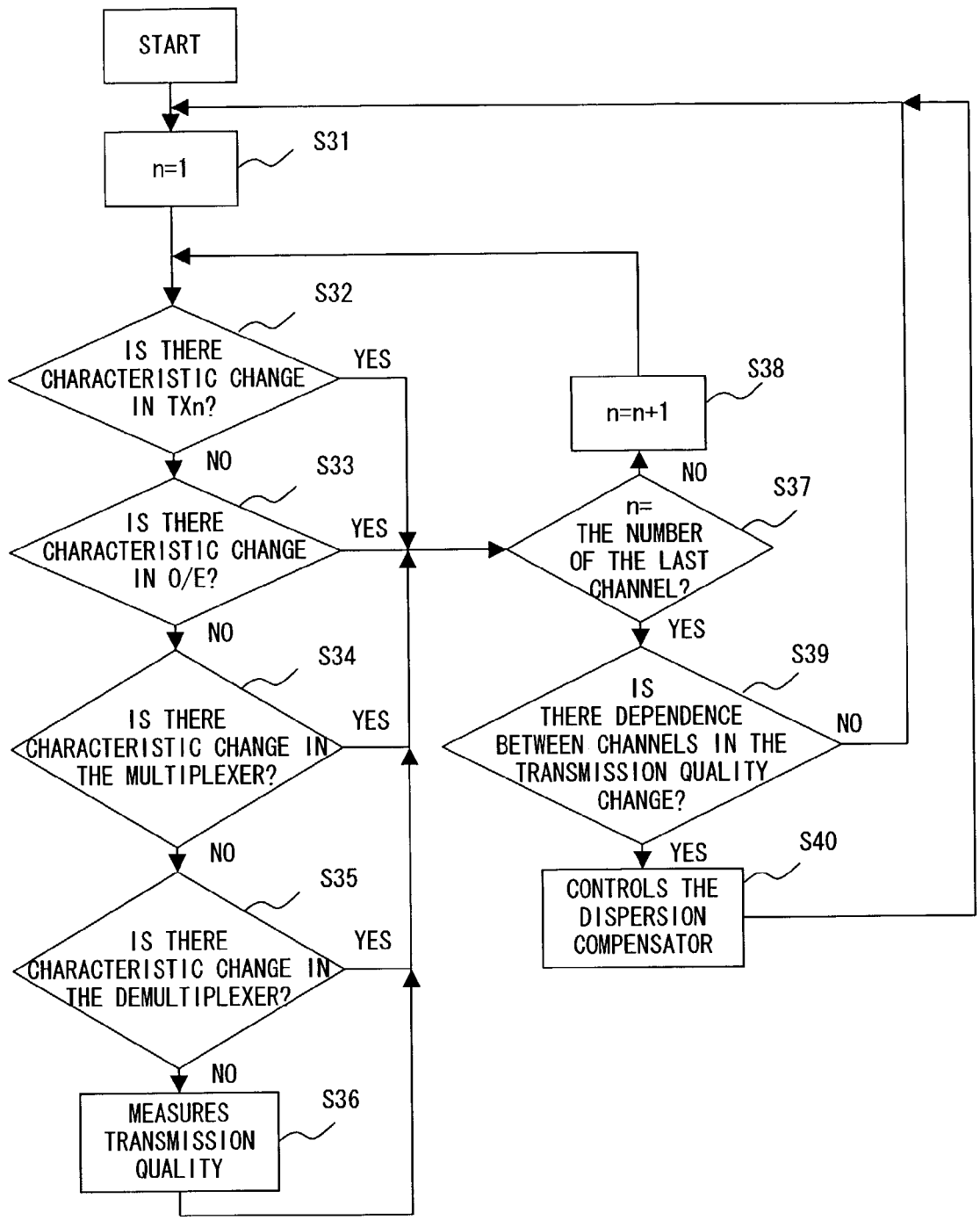
FIG. 41 is a flowchart showing a dispersion compensation control process in the third preferred embodiment.

FIG. 41 is a flowchart showing the chromatic dispersion control process in the third preferred embodiment. In FIG. 41, firstly, in step S31 n indicating a channel number, is set to 1 and in step S32 it is judged whether there is any characteristic change in the TX1, that is, the first transmitter. If there is no characteristic change in the TX1, then in step S33, it is judged whether there is any characteristic change in the O/E, that is, optical/electrical conversion unit 35. If there is no characteristic change in the O/E, then in step S35 it is judged that there is no characteristic change in the multiplexer 31. If there is no characteristic change in the multiplexer 31, then in step S35 it is judged whether there is no characteristic change in the demultiplexer 33. If there is no characteristic change in the demultiplexer 33, then in step S36 the transmission quality is measured, and the flow proceeds to a process in step S37. If in each of steps S32, S33, S34 and S35, it is judged that there is a characteristic change, the flow immediately proceeds to the process in step S37.

Then, in step S37 it is judged whether n is the last channel number, specifically whether the process reaches the last channel. If it has not yet reached the last channel, then in step S38 the channel number is incremented, and processes in and after step S32 are repeated.

If it is judged that it reaches the last channel, in step S39 it is judged whether there is any dependence between channels in the transmission quality change. If there is no dependence between channels, there is no need to control the dispersion compensator, and the processes in and after step S31 are repeated. If it is judged that there is dependence between channels, in step S40 the dispersion compensator 34 is controlled and then, the processes in and after step S31 are repeated.

Figure 42:
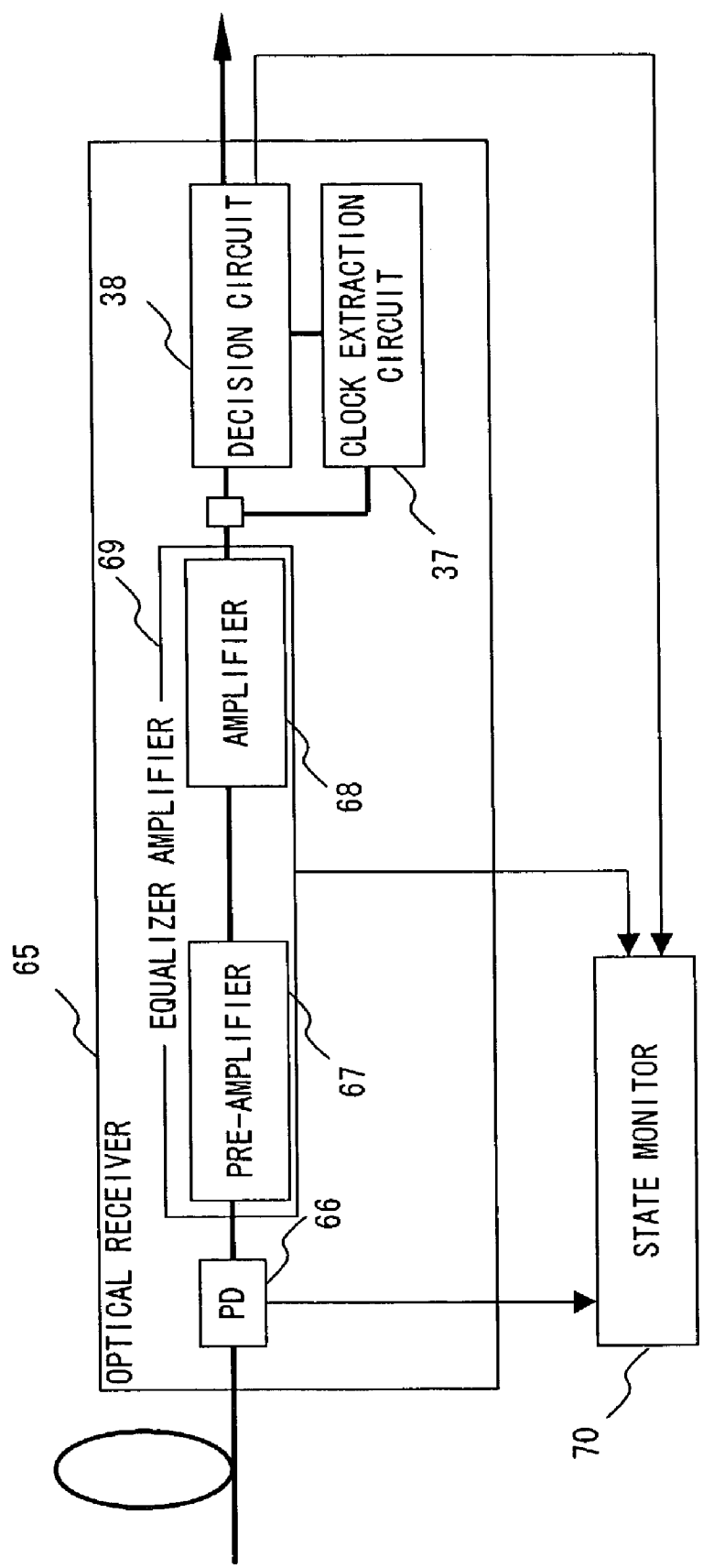
FIG. 42 shows the state monitor of a receiver in the third preferred embodiment.

FIG. 42 shows an example configuration of the receiver of the optical communication system in the third preferred embodiment. For example, the result of the monitor 55 monitoring each transmitter 30 must be supplied to the control circuit 40 of a receiver. Note, if the distance of a transmission line is long, it is more practical to restrict the provision of the state monitor only to the receiver.

In FIG. 42, an optical receiver 65 comprises a photo-diode (PD) 66 converting incoming optical signals to electrical signals; an equalization amplifier 69 further comprising a pre-amplifier 67 and an amplifier 68 that amplifies signals attenuated in a transmission line and re-shapes waveforms; a clock extraction circuit 37 extracting a clock signal from an incoming data signal; and an decision circuit 38 identifying the state of the incoming signal. Then, a state monitor 70 monitors the respective states of the PD 66, the equalization amplifier 69 and the decision circuit 38.

FIG. 43 shows characteristic items for the state monitor 70, shown in FIG. 42, to monitor. In FIG. 43, the characteristic items of the PD 66 include bias current, input optical power and the like. The characteristic items of the equalization amplifier 69 include power supply voltage, temperature, output amplitude and the like. The characteristic items of the decision circuit 38 include the identification phase in addition to the power supply voltage, the temperature, the identification threshold (reference potential), although it is in fact difficult to monitor the identification phase.

Lastly, the fourth preferred embodiment of the present invention is described below. The fourth preferred embodiment is characterized by compensating for polarization-mode dispersion in addition to the automatic compensation of chromatic dispersion in a transmission line in the first through third preferred embodiments. However, in this case, there is a problem in how to separate a polarization-mode dispersion (PMD) compensation from the chromatic dispersion compensation and how to control the two types of compensation.

As described earlier, several PMD compensation methods are proposed. Here, the case where a DOP (degree of popularization) monitor is used for a PMD monitor separating the chromatic dispersion compensation from PMD compensation is studied. For PMD detection using this DOP, see the following reference:

"Polarization-Mode Dispersion (PMD) Detection Sensitivity of Degree by Polarization Method for PMD compensation", ECOC'99, pp. 26-30

In this case, the stable measurement of PMD amounts has been verified by an experiment taking measurements from a DOP even when the amount of chromatic dispersion in a transmission line changes.

In the experiment, DOP in a receiver, receiving signals transmitted from a 40 Gb/s NRZ transmitter, is measured using a dispersion compensation fiber (DCF) as a transmission line and further using a polarization-mode dispersion emulator (PMDE), where measurements are taken in the case where only a DCF is used, in the case where only a PMDE is used and in the case where both PMDE and DCF are used together.

It has been confirmed that no respective results of DOP measurement using only a DCF, of PMDE measurement using only a PMDE, and measurement using both PMDE and DCF together, that are obtained when the amounts of change of chromatic dispersion are −407, −700 and −870 ps/nm, are affected by the amount of chromatic dispersion in the DCF. Therefore, it is clear that even when the amount of chromatic dispersion in a transmission line changes, using a PMD monitor detecting a DOP can stably compensate for PMD.

Figure 44:
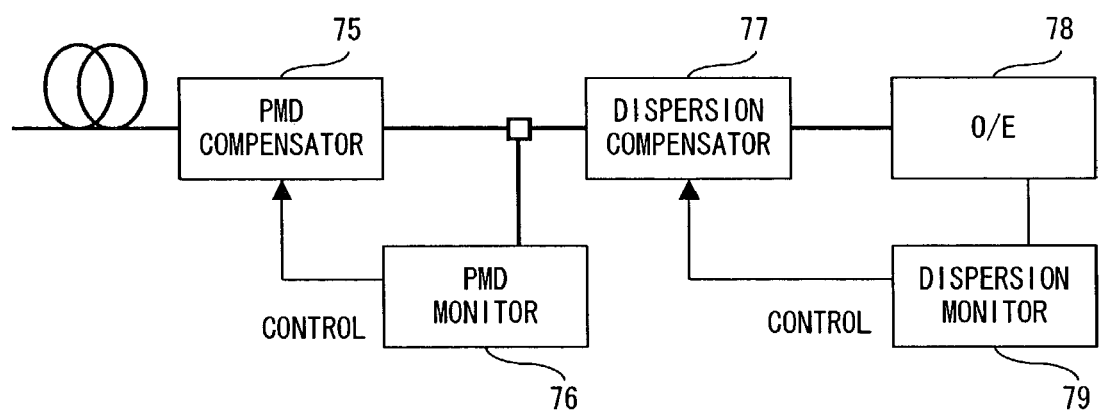
FIG. 44 shows an example basic configuration of a compensation system in the fourth preferred embodiment (No. 1)

FIG. 44 shows an example configuration of a compensation system using both a PMD compensator and a dispersion compensator together. In FIG. 44, controlling a PMD compensator 75 based on the result of a PMD monitor 76 detecting a DOP compensates for the PMD of an incoming optical signal input to a dispersion compensator 77, and a dispersion monitor 79 monitoring an optical/electrical converter (O/E) 78 correctly controls the dispersion compensator 77. However, in the preferred embodiment of the present invention, since a transmission quality monitor is used instead of the special dispersion monitor 79, the transmission quality monitor is affected by PMD. Therefore, it is impossible to correctly detect only a transmission quality change due to chromatic dispersion, which is a problem.

Figure 45:
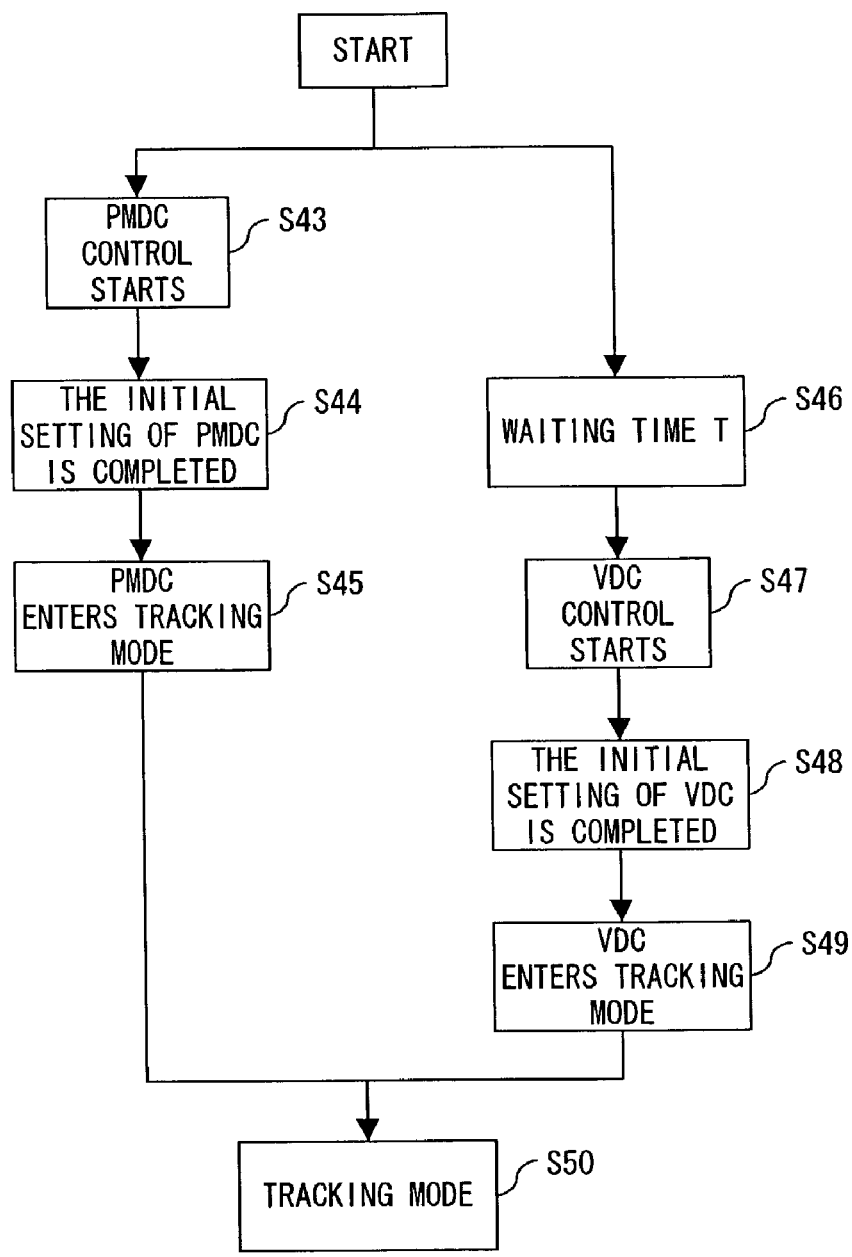
FIG. 45 shows the control input sequence of the system shown in FIG. 44.

FIG. 45 is a sequence chart showing the control input for coping with such a problem that is shown in FIG. 44. In FIG. 45, firstly, in step S43, the control of a PMD controller (PMDC) in the PMD compensator 75 is immediately started, and in step S44, the initial setting is completed. Then, in step S45, the PMDC enters into a tracking mode.

However, in step S46, time T, the wait time for substantial compensation by the PMD compensator 75, is set in the dispersion compensator (VDC) 77, and then, in step S47, the control of the VDC is started. Then, in step S48, the initial setting of the VDC is completed, and in step S49, the VDC enters into a tracking mode. After steps S45 and S49, the PMDC and VDC both enter into a tracking mode.

Figure 47:
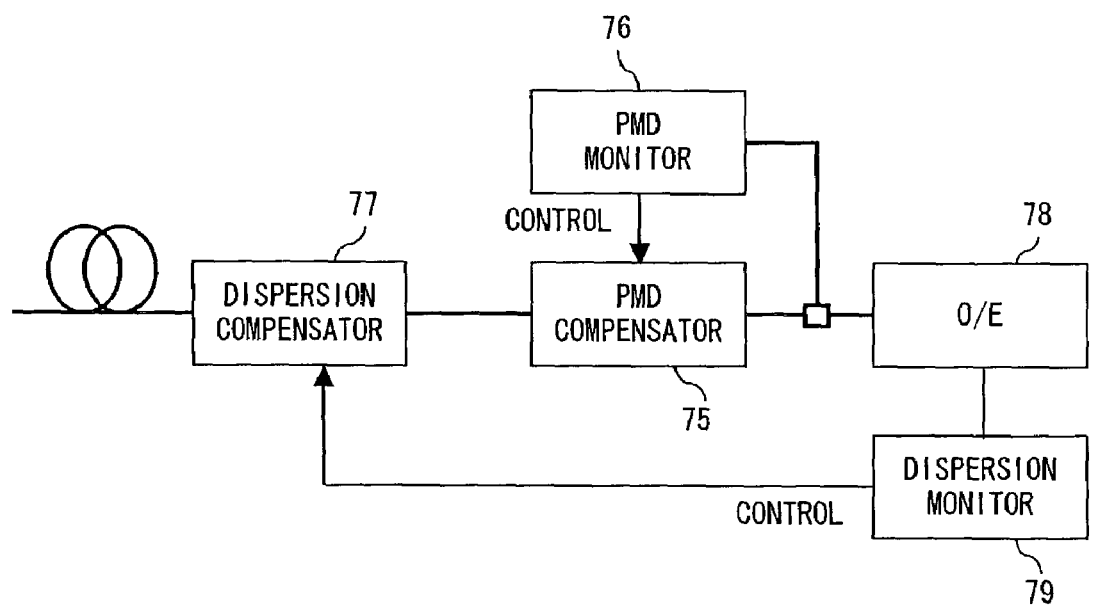
FIG. 47 shows an example basic configuration of a compensation system in the fourth preferred embodiment (No. 3)

FIGS. 46 and 47 show example configurations (No. 2 and 3) of the receiver of an optical communication system that compensates for both polarization-mode dispersion and chromatic dispersion. If both types of compensation are performed in this way, as described earlier, basically then, it is only the chromatic dispersion monitor 79 to be located after the PMD compensator since chromatic dispersion monitoring must be conducted after the completion of PMD compensation. The order of the dispersion compensator and the PMD compensator is regardless. In this way, the configurations shown in FIGS. 46 and 47 are available.

Figure 48:
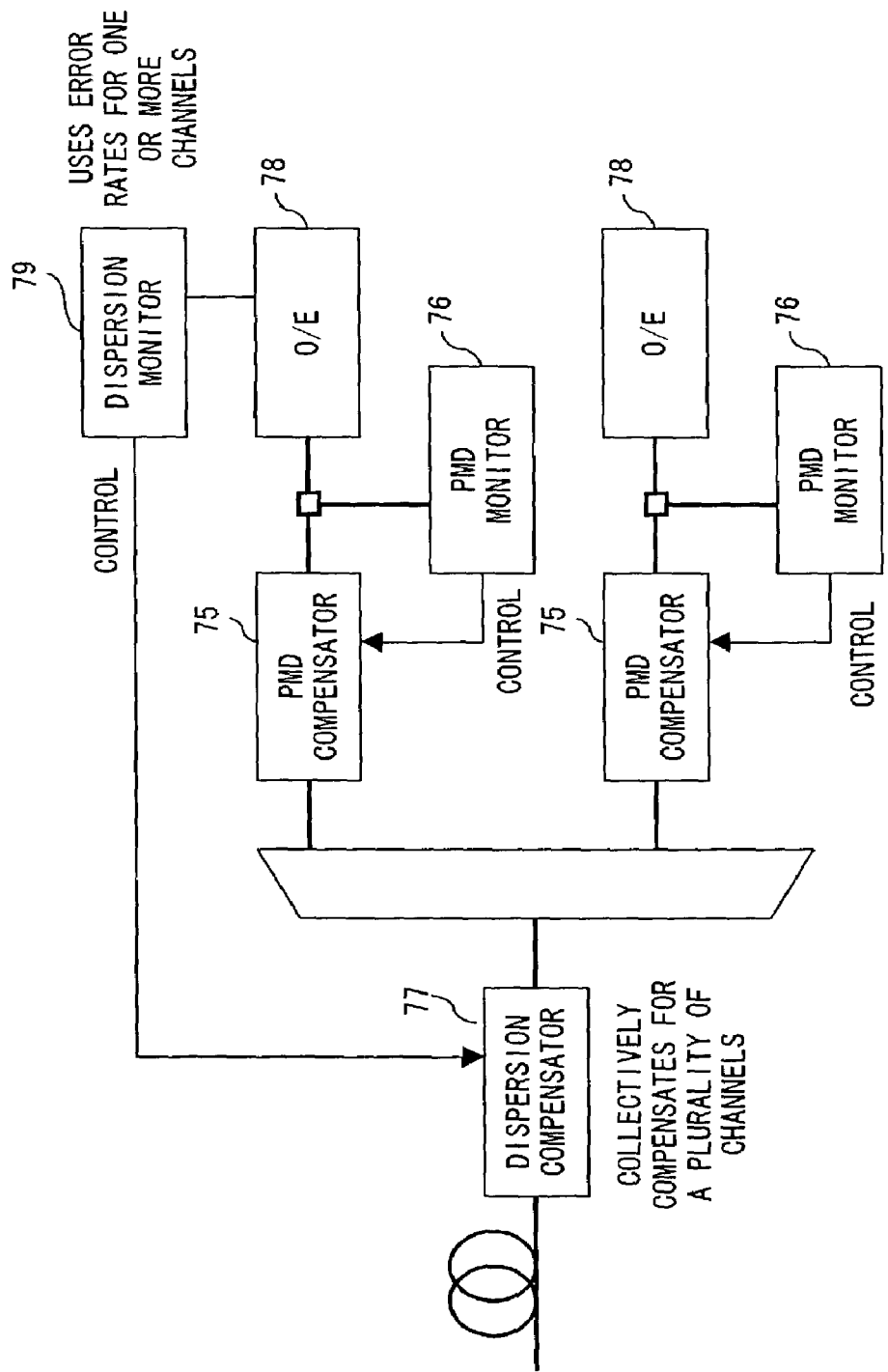
FIG. 48 shows an example basic configuration of a compensation system in the fourth preferred embodiment (No. 4)

FIG. 48 shows an example of the system configuration of a receiver using PMD compensation and chromatic dispersion compensation together (no. 4). In FIG. 48, the dispersion compensator 77 collectively applies chromatic dispersion compensation to a plurality of channels and the PMD compensator 75 applies polarization mode dispersion compensation to each channel. In this case, the dispersion compensator 77 carries out chromatic dispersion compensation using the dispersion monitor 79 that uses the respective channel error rate of one or more channels after PMD compensation, that is, a transmission quality monitor.

Although in the above description, polarization-mode dispersion is detected using a DOP, PMD compensation can be separated from chromatic dispersion compensation using the influence on transmission quality of a PMD monitor that is operated by a method other than that of detecting a DOP.

FIG. 49 shows the influence on transmission quality that is used for creating this separation. In FIG. 49, although as described above, chromatic dispersion has dependence between channels, PMD has no dependence between channels. The timewise change in speed of influences on transmission quality is slow in both cases of chromatic dispersion and PMD if it is due to a temperature change. However, if it is due to a pressure change, such as fiber touch and the like, the change in speed of the influences by PMD is fast. Therefore, the two types of compensation can be separated utilizing such differences in temperature.

Figure 51:
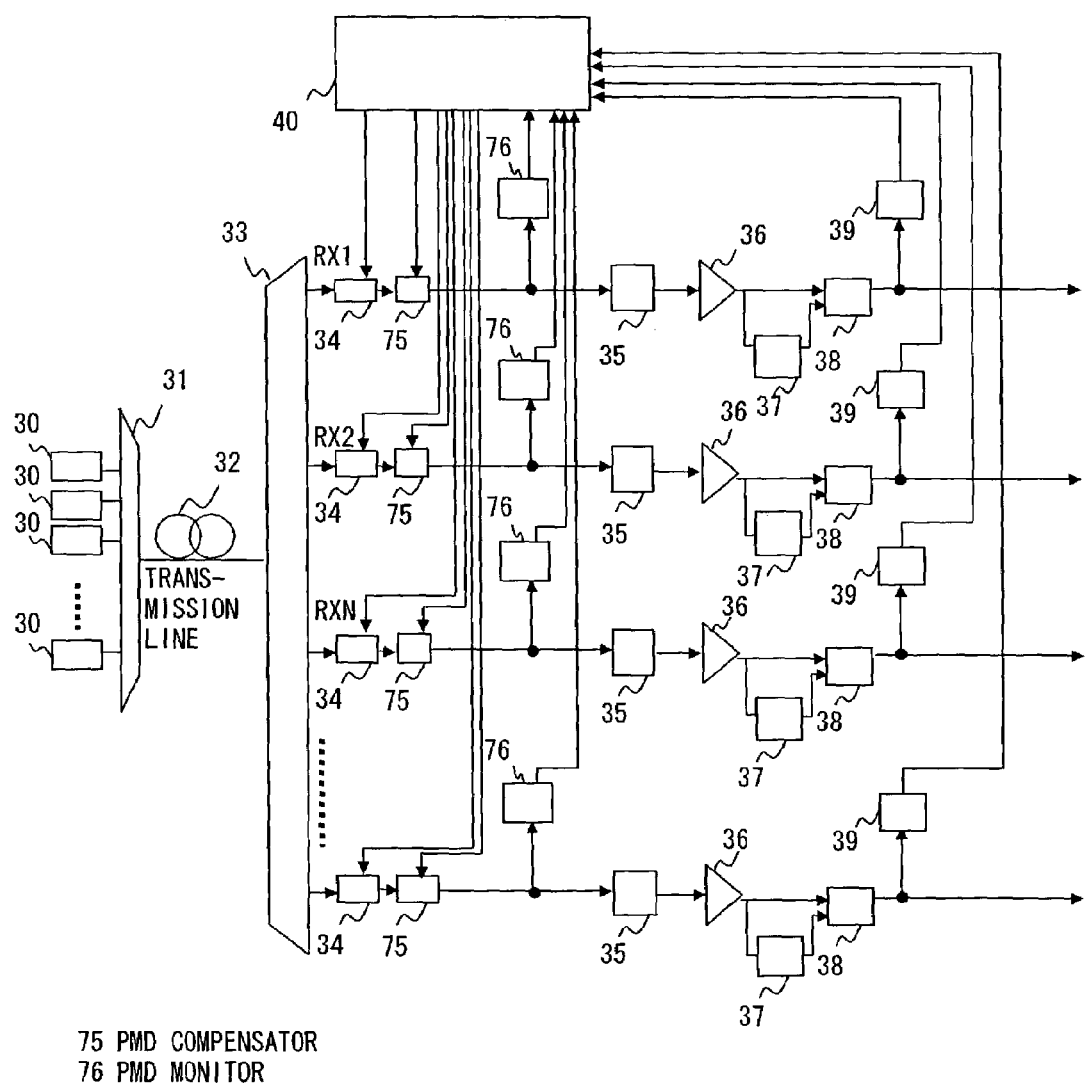
FIG. 51 shows an example configuration of an optical communication system in the fourth preferred embodiment (No. 2)

FIGS. 50 through 52 show example configurations of an optical communication system compensating for polarization-mode dispersion and chromatic dispersion. FIG. 50 shows the first example configuration. In this case, chromatic dispersion is collectively compensated for all channels, as shown in FIG. 48, while polarization-mode dispersion is individually compensated for each channel. In this case, a transmission quality monitor is used instead of a chromatic dispersion monitor.

FIGS. 51 and 52 show the second and third example configurations, respectively. In each of these cases, chromatic dispersion and polarization-mode dispersion are compensated for in each channel. However, in the third example configuration, a controller 80 separates the control of the dispersion compensator 34 from that of the PMD compensator 75.

Figure 53:
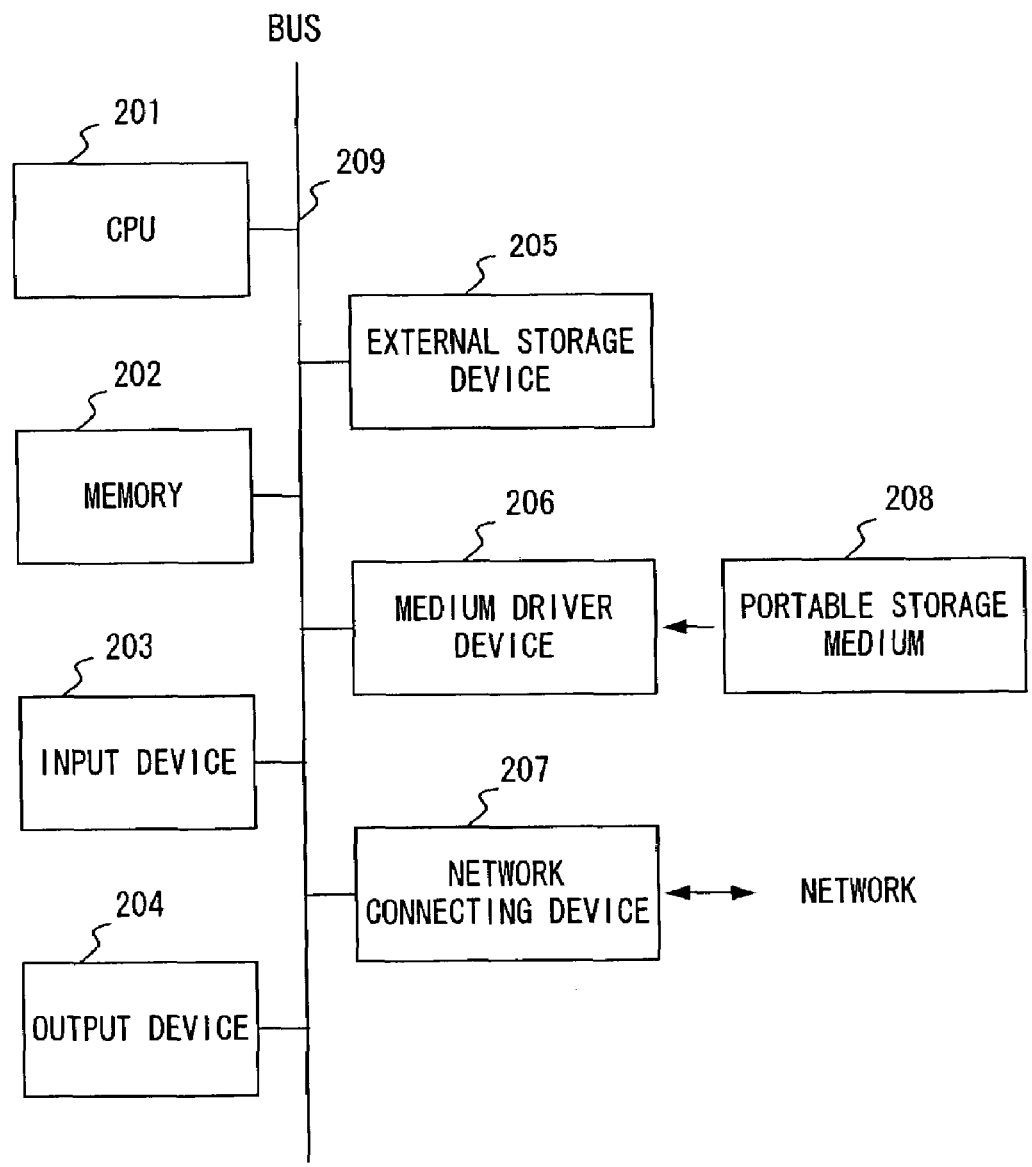
FIG. 53 shows the configuration of a computer controlling variable chromatic dispersion compensation process according to the present invention.

The control of a variable chromatic dispersion compensator of the present invention can be realized using an information processor, such as a computer, as shown in FIG. 53. The computer shown in FIG. 53 comprises a CPU 201, a memory 202, an input device 203, an output device 204, an external storage device 205, a medium driver device 206 and a network connection device 207. A bus 209 connects the devices to one another.

The memory 202 includes a ROM read-only memory) a RAM (random-access memory) and the like. The memory 202 stores a program and data to be used for the process. The CPU 201 performs necessary processes by using the memory 202 and executing the program.

The input device 203 includes a keyboard, a pointing device and the like. The output device 204 includes a display and the like.

The external storage device 205 includes a magnetic disk device, an optical disk device, a magneto-optical disk device and the like. The external storage device 205 stores the program and data, and can also load the program and data onto the memory 202 and use them, as requested.

The medium driver device 206, drives a portable storage medium 208 and accesses the recorded contents. For the portable storage medium 208, any computer-readable storage medium, such as a memory card, a memory stick, a flexible disk, a CD-ROM (compact disc read-only memory), an optical disk, a magneto-optical disk, a DVD (digital versatile disk) and the like, is used. This portable storage medium 208 stores the program and data, and can also load them into the memory 202 and use them, as requested.

The network connection device 207 is used to connect the computer to a network. The network connection device 207 can also receive the program and data from an external device, and can load them into the memory 202 and use them, as requested.

Figure 54:
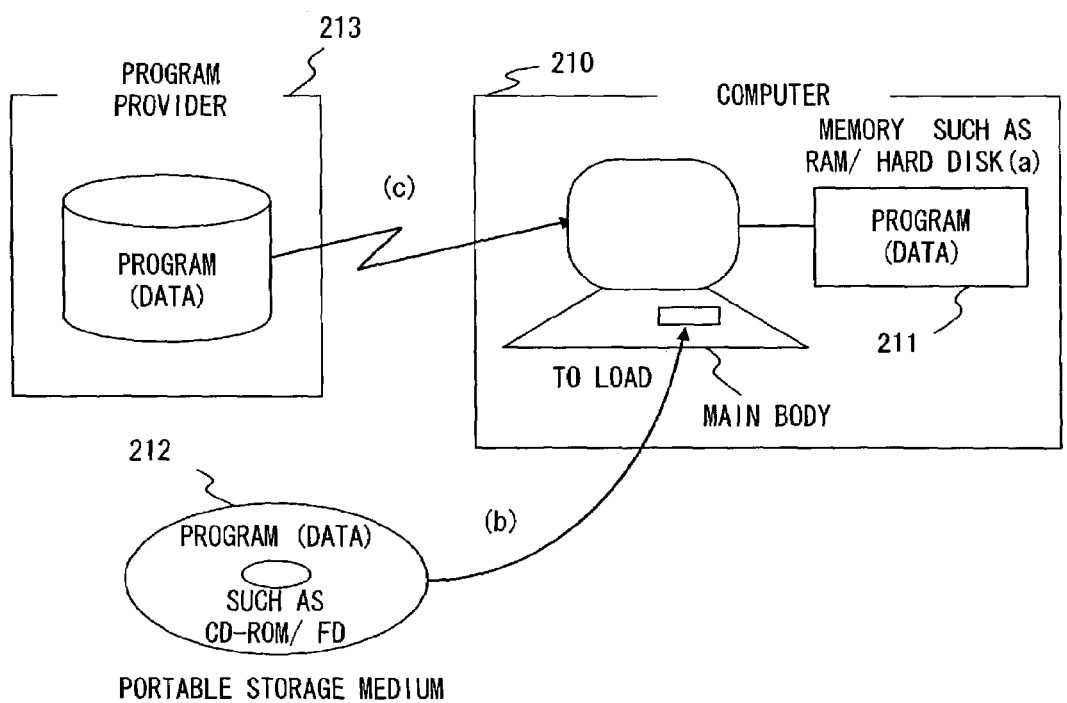
FIG. 54 shows the loading to a computer of a program according to the present invention.

FIG. 54 shows how to provide a program and data that are related to the present invention. The program and data are provided by any of the following three methods (a) through (c).

(a) The program and data are stored in the external storage device, such as the RAM/ROM hard disks of the computer 210 and the like. In this case, a program 211 and the like, is stored, for example, before shipment.
(b) They are stored in the portable storage medium 212, such as a CD-ROM, a floppy disk and the like. In this case, the program and data stored in the portable storage medium 212 are stored in the external storage device 205 and memory 202 of the computer 210.
(c) They are provided by a provider 213 connected to the computer through a network (line). In this case, basically, the computer 210 obtains the program and data by downloading them from the stored location of the provider 213.

The present invention is not restricted to the preferred embodiments described above, and a variety of configurations can be used as long as they do not deviate from the subject matter of the present invention.

According to the present invention, by separating influences on transmission quality due to chromatic dispersion in a transmission line, for example, from influences due to polarization-mode dispersion, the chromatic dispersion can be optimally controlled using a general-purpose transmission quality monitor, instead of a special dispersion monitor, and accordingly, system performance can be improved. In this case, chromatic dispersion and polarization-mode dispersion can be compensated for by locating the transmission quality monitor after the polarization-mode dispersion compensator, and accordingly, the present invention greatly contributes to the realization of an ultra-high-speed optical communication system.

What is claimed is:

1. An automatic dispersion compensation device with a variable chromatic dispersion compensator for incoming optical signals input from an optical transmitter transmitting optical signals for a plurality of channels through a transmission line, comprising:

a transmission quality measurement unit measuring transmission quality of incoming optical signals for each of the plurality of channels;

a determination unit detecting whether the transmission quality is depended upon the optical signal wavelength, and reporting a degradation of the incoming optical signal as a degradation due to a chromatic dispersion if the transmission quality is depended upon the optical signal wavelength;

a chromatic dispersion compensation amount control unit controlling the variable chromatic dispersion compensator in such a way as to compensate for the degradation due to the chromatic dispersion if the determination unit reports that the transmission quality is depended upon the optical signal wavelength, wherein if the transmission quality is dependent on an optical signal wavelength, then it is determined that there is chromatic dispersion and compensation is performed, and if the transmission quality is not dependent on the optical signal wavelength then it is determined that there is no chromatic dispersion; and a residual chromatic dispersion amount increase/decrease unit increasing/decreasing the difference in the amount of dispersion compensation between channels for any residual amount of chromatic dispersion obtained as a result of compensation by the variable chromatic dispersion compensator, depending on the optical signal wavelength; and a chromatic dispersion amount increase/decrease judgment unit comparing the measurement result of transmission quality after compensation by the variable chromatic dispersion compensator and the residual chromatic dispersion amount increase/decrease unit, between channels, and judging whether the amount of chromatic dispersion in the transmission line increases or decreases.

2. The automatic dispersion compensation device according to claim 1, wherein said residual chromatic dispersion amount increase/decrease unit changes the difference in the amount of dispersion between channels in the form of a slope across the entire channel range, based on an increase in the number of the channels depending on wavelength.

3. The automatic dispersion compensation device according to claim 1, wherein said residual chromatic dispersion amount increase/decrease unit changes the difference in the amount of dispersion between channels in the form of a step across the entire channel range, based on an increase in the number of the channels depending on wavelength.

4. The automatic dispersion compensation device according to claim 1, wherein said residual wavelength dispersion amount increase/decrease unit changes the difference in the amount of dispersion between channels in the form of slope in a specific part of the channel range, based on an increase in the number of the channels depending on wavelength.

5. The automatic dispersion compensation device according to claim 1, wherein said residual wavelength dispersion amount increase/decrease unit changes the difference in the amount of dispersion between channels in the form of a step in a specific part of the channel range, based on an increase in the number of the channels depending on wavelength.

6. The automatic dispersion compensation device according to claim 1, further comprising:

a receiver state detection unit detecting the state of each unit of a receiver receiving optical signals transmitted through the transmission line, wherein said chromatic dispersion compensation amount control unit stops control by a variable chromatic dispersion compensator in accordance with the detection result of the receiver state and the measurement result of said transmission quality measurement unit.

7. The automatic dispersion compensation device according to claim 1, further comprising in addition to the variable chromatic dispersion compensator:

a polarization-mode dispersion compensator corresponding to signals from each of one or more channels input from the transmission line; and a polarization-mode dispersion monitor detecting an amount of polarization-mode dispersion after compensation by the polarization-mode dispersion compensator, wherein said chromatic dispersion compensation amount control unit controls the variable chromatic dispersion compensator and polarization-mode dispersion compensator in accordance with the detection result of the polarization-mode dispersion monitor and a timewise change tendency of said transmission quality measurement unit.

8. The automatic dispersion compensation device of claim 1, wherein the factors other than chromatic dispersion include at least one of change in the identification threshold of a receiver, change in the identification phase of a receiver, wavelength change of a transmitting light source, degradation of components and materials, and failure of components and materials.

9. The automatic dispersion compensation device of claim 1, wherein:

the determination unit reports that a degradation of the incoming optical signal as a degradation due to a dispersion by a temperature change if the transmission quality is not depended upon the optical signal wavelength.

10. An automatic dispersion compensation method compensating for a variable chromatic dispersion of incoming optical signals input from an optical transmitter transmitting optical signals for a plurality of channels though a transmission line, comprising:

measuring transmission quality of incoming optical signals for each of the plurality of channels to thereby produce a measurement result;

separating and detecting transmission quality degradation due to chromatic dispersion in the transmission line, in the measurement result of the transmission quality from degradation due to factors other than chromatic dispersion, on the basis of a dependence between channels of the incoming optical signals; and controlling the variable chromatic dispersion compensation in such a way as to compensate for the degradation; and adding a slope to the amount of chromatic dispersion compensation, wherein if the transmission quality is dependent on an optical signal wavelength, then it is determined that there is chromatic dispersion and compensation is performed, and if the transmission quality is not dependent on the optical signal wavelength then it is determined that there is no chromatic dispersion.

11. The automatic dispersion compensation method of claim 10, wherein the factors other than chromatic dispersion include at least one of change in the identification threshold of a receiver, change in the identification phase of a receiver, wavelength change of a transmitting light source, degradation of components and materials, and failure of components and materials.

12. A computer-readable storage medium on which is recorded a program enabling the computer to compensate for variable chromatic dispersion of incoming optical signals input from an optical transmitter transmitting optical signals for a plurality of channels though a transmission line, the program executing a process, comprising:

receiving a transmission quality measurement result from incoming optical signals for each of the plurality of channels;

separating and detecting transmission quality degradation due to chromatic dispersion in the transmission line, in the measurement result of the transmission quality from degradation due to factors other than chromatic dispersion, on the basis of a dependence between channels of the incoming optical signals;

controlling the variable chromatic dispersion compensation in such a way as to compensate for the degradation; and adding a slope to the amount of chromatic dispersion compensation, wherein if the transmission quality is dependent on an optical signal wavelength, then it is determined that there is chromatic dispersion and compensation is performed, and if the transmission quality is not dependent on the optical signal wavelength then it is determined that there is no chromatic dispersion.

13. The computer-readable storage medium of claim 12, wherein the factors other than chromatic dispersion include at least one of change in the identification threshold of a receiver, change in the identification phase of a receiver, wavelength change of a transmitting light source, degradation of components and materials, and failure of components and materials.

14. An automatic dispersion compensation device with a variable chromatic dispersion compensator for incoming optical signals input from an optical transmitter transmitting optical signals for a plurality of channels though a transmission line, comprising:

transmission quality measurement means for measuring transmission quality of incoming optical signals for each of the plurality of channels to thereby produce a measurement result; and chromatic dispersion compensation amount control means for separating and detecting transmission quality degradation due to chromatic dispersion in the transmission line, in the measurement result of the transmission quality measurement means from degradation due to other factors and controlling the variable chromatic dispersion compensator in such a way as to compensate for degradation due to factors other than chromatic dispersion, on the basis of a dependence between channels of the incoming optical signals, wherein if the transmission quality is dependent on an optical signal wavelength, then it is determined that there is chromatic dispersion and compensation is performed, and if the transmission quality is not dependent on the optical signal wavelength then it is determined that there is no chromatic dispersion.

15. The automatic dispersion compensation device of claim 14, wherein the factors other than chromatic dispersion include at least one of change in the identification threshold of a receiver, change in the identification phase of a receiver, wavelength change of a transmitting light source, degradation of components and materials, and failure of components and materials.

16. An apparatus comprising:

a transmission quality measurement unit receiving a wavelength division multiplexed (WDM) optical signal having been transmitted through a transmission line and including a plurality of channels multiplexed together, and measuring transmission quality of each channel in the received WDM optical signal to thereby produce a measurement of the transmission quality of each channel, wherein if the transmission quality is dependent on an optical signal wavelength, then it is determined that there is chromatic dispersion and compensation is performed, and if the transmission quality is not dependent on the optical signal wavelength then it is determined that there is no chromatic dispersion; and a chromatic dispersion compensation amount control unit receiving the measurement of the transmission quality of each channel, separating transmission quality degradation based on the received measurement of each channel due to chromatic dispersion and polarization mode dispersion from transmission quality degradation due to other factors, and controlling a variable chromatic dispersion compensator so as to compensate for the separated transmission quality degradation in the WDM optical signal due to said other factors.

17. A method comprising:

receiving a wavelength division multiplexed (WDM) optical signal having been transmitted through a transmission line and including a plurality of channels multiplexed together;

measuring transmission quality of each channel in the received WDM optical signal to thereby produce a measurement of the transmission quality of each channel;

separating transmission quality degradation based on the received measurement of each channel due to chromatic dispersion and polarization mode dispersion from transmission quality degradation due to other factors;

controlling a variable chromatic dispersion compensator so as to compensate for the separated transmission quality degradation in the WDM optical signal due to said other factors; and adding a slope to the amount of chromatic dispersion compensation, wherein if the transmission quality is dependent on an optical signal wavelength, then it is determined that there is chromatic dispersion and compensation is performed, and if the transmission quality is not dependent on the optical signal wavelength then it is determined that there is no chromatic dispersion.

* * * * *